United States Patent
Dontu et al.

(10) Patent No.: US 8,730,976 B2
(45) Date of Patent: May 20, 2014

(54) SYSTEM AND METHOD FOR PREVENTING ERRONEOUS LINK AGGREGATION DUE TO COMPONENT RELOCATION

(75) Inventors: Sitaram Dontu, Sunnyvale, CA (US); Norman W. Finn, Livermore, CA (US); Nelson B. D'Souza, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 1335 days.

(21) Appl. No.: 10/919,670

(22) Filed: Aug. 17, 2004

(65) Prior Publication Data

US 2006/0039384 A1 Feb. 23, 2006

(51) Int. Cl.
*H04L 12/28* (2006.01)

(52) U.S. Cl.
USPC .............................. 370/400; 370/401; 370/242

(58) Field of Classification Search
USPC .......... 370/216, 219, 256, 389, 400; 709/231, 709/239, 240; 710/9, 10
See application file for complete search history.

(56) References Cited

U.S. PATENT DOCUMENTS

| | | | |
|---|---|---|---|
| 4,387,371 A | 6/1983 | Beker et al. | 340/825.52 |
| 5,058,110 A * | 10/1991 | Beach et al. | 370/464 |
| 5,311,593 A | 5/1994 | Carmi | 370/400 |
| 5,371,852 A | 12/1994 | Attanasio et al. | 709/245 |
| 5,394,402 A | 2/1995 | Ross | 370/402 |
| 5,400,715 A | 3/1995 | Roach et al. | 370/392 |
| 5,473,599 A | 12/1995 | Li et al. | 370/16 |
| 5,517,620 A | 5/1996 | Hashimoto et al. | 12/28 |
| 5,615,340 A | 3/1997 | Dai et al. | 709/250 |
| 5,680,589 A | 10/1997 | Klingman | 370/901 |
| 5,822,512 A | 10/1998 | Goodrm et al. | 395/182.11 |
| 5,825,772 A | 10/1998 | Dobbins et al. | 370/396 |
| 5,835,725 A * | 11/1998 | Chiang et al. | 709/228 |
| 5,872,783 A | 2/1999 | Chin | 370/395.32 |
| 5,959,968 A * | 9/1999 | Chin et al. | 370/216 |
| 5,959,972 A | 9/1999 | Hamami | 370/228 |
| 5,959,989 A | 9/1999 | Gleeson et al. | 370/390 |

(Continued)

FOREIGN PATENT DOCUMENTS

| | | | | |
|---|---|---|---|---|
| CN | 1407762 A | 4/2003 | | |
| EP | 1 035 685 | 9/2000 | | 12/18 |

(Continued)

OTHER PUBLICATIONS

Knight, S. et al. Virtual Router Redundancy Protocol, IETF, Apr. 1998, 27 pages.

(Continued)

*Primary Examiner* — Brian O'Connor
(74) *Attorney, Agent, or Firm* — Campbell Stephenson, LLP

(57) ABSTRACT

Various methods and systems for preventing erroneous link aggregation due to component relocation are disclosed. Such methods include a method for changing the identifier used by a network device and communicating the identifier change to a peer network device without disrupting an aggregated link. In one embodiment, a method involves detecting an identifier change and sending a Port Aggregation Protocol (PAgP) protocol data unit (PDU) that includes a new identifier and information. The information indicates the identifier change. The new identifier identifies a network device subsequent to the identifier change. Another embodiment of a method involves detecting an identifier change and, subsequent to the identifier change, sending a link aggregation protocol PDU that includes an "old device identifier" field dedicated to conveying an old identifier. The old identifier identifies a network device prior to the identifier change.

15 Claims, 14 Drawing Sheets

(56) References Cited

U.S. PATENT DOCUMENTS

| | | | |
|---|---|---|---|
| 5,978,852 A | 11/1999 | Myrick et al. | 709/238 |
| 6,032,194 A * | 2/2000 | Gai et al. | 709/239 |
| 6,058,238 A | 5/2000 | Ng | 709/223 |
| 6,064,671 A | 5/2000 | Killian | 370/389 |
| 6,108,300 A | 8/2000 | Coile et al. | 370/217 |
| 6,163,543 A * | 12/2000 | Chin et al. | 370/400 |
| 6,181,681 B1 | 1/2001 | Hiscock et al. | 370/279 |
| 6,181,699 B1 | 1/2001 | Crinion et al. | 370/392 |
| 6,195,351 B1 | 2/2001 | Hiscock et al. | 370/389 |
| 6,202,114 B1 * | 3/2001 | Dutt et al. | 710/311 |
| 6,222,820 B1 | 4/2001 | Hamami | 370/218 |
| 6,229,787 B1 | 5/2001 | Byrne | 370/218 |
| 6,236,659 B1 | 5/2001 | Pascoe | 370/404 |
| 6,243,360 B1 | 6/2001 | Basilico | 370/231 |
| 6,266,335 B1 * | 7/2001 | Bhaskaran | 370/399 |
| 6,275,953 B1 | 8/2001 | Vahalia et al. | |
| 6,285,656 B1 | 9/2001 | Chaganty et al. | 370/228 |
| 6,298,061 B1 * | 10/2001 | Chin et al. | 370/400 |
| 6,308,218 B1 | 10/2001 | Vasa | 709/230 |
| 6,308,220 B1 | 10/2001 | Mathur | 709/238 |
| 6,377,992 B1 | 4/2002 | Fernandez et al. | |
| 6,388,995 B1 | 5/2002 | Gai et al. | 370/256 |
| 6,400,715 B1 * | 6/2002 | Beaudoin et al. | 370/392 |
| 6,421,787 B1 | 7/2002 | Slaughter et al. | 714/4 |
| 6,460,088 B1 | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 * | 3/2003 | Dutt et al. | 370/256 |
| 6,567,403 B1 | 5/2003 | Congdon et al. | 370/389 |
| 6,570,845 B1 | 5/2003 | Blanc et al. | 370/218 |
| 6,657,973 B1 | 12/2003 | Arima | 370/254 |
| 6,658,016 B1 | 12/2003 | Dai et al. | 370/424 |
| 6,674,713 B1 | 1/2004 | Berg et al. | 370/217 |
| 6,678,241 B1 * | 1/2004 | Gai et al. | 370/216 |
| 6,687,758 B2 * | 2/2004 | Craft et al. | 709/250 |
| 6,690,668 B1 | 2/2004 | Szczepanek et al. | 370/392 |
| 6,697,339 B1 * | 2/2004 | Jain | 370/256 |
| 6,728,780 B1 | 4/2004 | Hebert | 709/239 |
| 6,735,198 B1 | 5/2004 | Edsall et al. | 370/389 |
| 6,735,205 B1 | 5/2004 | Mankude et al. | 370/395.32 |
| 6,738,345 B1 | 5/2004 | Williamson | 370/217 |
| 6,760,776 B1 | 7/2004 | Gallo et al. | 709/238 |
| 6,804,721 B2 | 10/2004 | Wils et al. | 709/230 |
| 6,810,421 B1 | 10/2004 | Ishizaki et al. | 709/226 |
| 6,816,467 B1 | 11/2004 | Muller et al. | 370/256 |
| 6,856,591 B1 | 2/2005 | Ma et al. | 370/216 |
| 6,915,340 B2 * | 7/2005 | Tanaka | 709/220 |
| 6,938,095 B2 | 8/2005 | Basturk et al. | 709/238 |
| 6,941,487 B1 * | 9/2005 | Balakrishnan et al. | 714/4 |
| 6,980,534 B1 | 12/2005 | Nee et al. | 370/329 |
| 6,981,174 B1 | 12/2005 | Hanning | 714/5.1 |
| 7,042,855 B1 | 5/2006 | Gilchrist et al. | 370/328 |
| 7,050,433 B2 * | 5/2006 | Ando et al. | 370/392 |
| 7,061,858 B1 * | 6/2006 | Di Benedetto et al. | 370/219 |
| 7,061,875 B1 * | 6/2006 | Portolani et al. | 370/256 |
| 7,079,533 B1 | 7/2006 | Erimli et al. | 370/389 |
| 7,126,923 B1 | 10/2006 | Yang et al. | 370/256 |
| 7,127,633 B1 | 10/2006 | Olson et al. | 714/4 |
| 7,130,305 B2 | 10/2006 | Kuukankorpi et al. | 370/392 |
| 7,152,178 B1 | 12/2006 | Vook et al. | 714/4.3 |
| 7,178,052 B2 | 2/2007 | Hebbar et al. | 714/4 |
| 7,188,189 B2 | 3/2007 | Karol et al. | 709/238 |
| 7,251,217 B2 | 7/2007 | Wong et al. | 370/232 |
| 7,286,853 B2 * | 10/2007 | Meier | 455/560 |
| 7,502,865 B2 * | 3/2009 | Seto | 709/238 |
| 7,636,369 B2 | 12/2009 | Wong | 370/419 |
| 7,639,605 B2 | 12/2009 | Narayanan et al. | 370/392 |
| 7,668,123 B1 * | 2/2010 | Scott et al. | 370/310 |
| 7,672,228 B1 * | 3/2010 | Senevirathne et al. | 370/219 |
| 7,818,628 B1 | 10/2010 | Bishara et al. | 714/43 |
| 7,869,803 B2 | 1/2011 | Corson et al. | 455/433 |
| 8,005,981 B2 * | 8/2011 | Tuck et al. | 709/238 |
| 8,084,581 B1 | 12/2011 | Wong et al. | 370/254 |
| 8,094,581 B2 * | 1/2012 | Bahls et al. | 370/254 |
| 2001/0014097 A1 | 8/2001 | Beck et al. | 370/401 |
| 2002/0016874 A1 * | 2/2002 | Watanuki et al. | 710/51 |
| 2002/0018489 A1 | 2/2002 | Ambe et al. | 370/475 |
| 2002/0073338 A1 | 6/2002 | Burrows et al. | 726/13 |
| 2002/0080720 A1 | 6/2002 | Pegrum et al. | 370/236 |
| 2002/0087716 A1 | 7/2002 | Mustafa | 709/236 |
| 2002/0089789 A1 | 7/2002 | Wang et al. | 370/389 |
| 2002/0091755 A1 | 7/2002 | Narin | 709/203 |
| 2002/0103921 A1 | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1 | 10/2002 | Kaplan | 370/390 |
| 2002/0152320 A1 | 10/2002 | Lau | 709/238 |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong et al. | 370/539 |
| 2002/0184387 A1 | 12/2002 | Yamaya et al. | 709/238 |
| 2002/0186654 A1 | 12/2002 | Tornar | 370/225 |
| 2002/0188711 A1 | 12/2002 | Meyer et al. | 709/223 |
| 2002/0196802 A1 | 12/2002 | Sakov et al. | 370/432 |
| 2003/0007489 A1 | 1/2003 | Krishnan et al. | 370/392 |
| 2003/0026248 A1 | 2/2003 | Hiroki | 370/352 |
| 2003/0037165 A1 | 2/2003 | Shinomiya | 709/238 |
| 2003/0051061 A1 | 3/2003 | Hank et al. | 709/250 |
| 2003/0061533 A1 | 3/2003 | Perloff et al. | 714/9 |
| 2003/0093557 A1 | 5/2003 | Giraud et al. | 709/239 |
| 2003/0097470 A1 | 5/2003 | Lapuh et al. | 709/239 |
| 2003/0110344 A1 | 6/2003 | Szczepanek et al. | 711/100 |
| 2003/0142680 A1 | 7/2003 | Oguchi | 370/400 |
| 2003/0152101 A1 | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0174709 A1 | 9/2003 | Shankar | 370/295.31 |
| 2003/0198231 A1 | 10/2003 | Kalkunte et al. | 370/395.31 |
| 2004/0057469 A1 | 3/2004 | Nuss et al. | 370/535 |
| 2004/0066781 A1 | 4/2004 | Shankar et al. | 370/389 |
| 2004/0078621 A1 | 4/2004 | Talaugon et al. | 714/4 |
| 2004/0098501 A1 | 5/2004 | Finn | 709/236 |
| 2004/0105390 A1 | 6/2004 | Saksio | 370/245 |
| 2004/0156390 A1 | 8/2004 | Prasad et al. | 370/466 |
| 2004/0179507 A1 | 9/2004 | Batra et al. | 370/343 |
| 2004/0208116 A1 | 10/2004 | Saint Etienne et al. | 370/216 |
| 2005/0036488 A1 | 2/2005 | Kalkunte et al. | 370/389 |
| 2005/0041665 A1 | 2/2005 | Weyman et al. | 370/390 |
| 2005/0044186 A1 | 2/2005 | Petrisor | 709/219 |
| 2005/0058063 A1 | 3/2005 | Masuyama et al. | 370/219 |
| 2005/0063395 A1 | 3/2005 | Smith et al. | 370/399 |
| 2005/0083933 A1 | 4/2005 | Fine et al. | 370/390 |
| 2005/0089014 A1 | 4/2005 | Levin et al. | 370/351 |
| 2005/0091358 A1 | 4/2005 | Mehra et al. | 709/223 |
| 2005/0111483 A1 | 5/2005 | Cripe et al. | 370/463 |
| 2005/0169311 A1 | 8/2005 | Millet et al. | 370/471 |
| 2005/0193114 A1 | 9/2005 | Colby et al. | 709/226 |
| 2005/0198371 A1 | 9/2005 | Smith et al. | 709/238 |
| 2005/0207436 A1 | 9/2005 | Varma | 370/412 |
| 2005/0243826 A1 | 11/2005 | Smith et al. | 370/392 |
| 2005/0259646 A1 * | 11/2005 | Smith et al. | 370/389 |
| 2005/0265346 A1 | 12/2005 | Ho et al. | 370/392 |
| 2006/0007859 A1 | 1/2006 | Kadambi et al. | 370/229 |
| 2006/0015643 A1 | 1/2006 | Orava et al. | 709/238 |
| 2006/0062187 A1 | 3/2006 | Rune | 370/338 |
| 2006/0215679 A1 | 9/2006 | Musoll et al. | 370/412 |
| 2006/0262791 A1 | 11/2006 | Kadambi et al. | 370/389 |
| 2007/0154219 A1 | 7/2007 | Feinberg | 398/104 |
| 2007/0159771 A1 | 7/2007 | Zhang et al. | 370/230 |
| 2007/0180266 A1 | 8/2007 | Kang et al. | 713/189 |
| 2009/0080431 A1 | 3/2009 | Rekhter | 370/392 |
| 2009/0134996 A1 | 5/2009 | White, II et al. | 340/538 |
| 2009/0190588 A1 | 7/2009 | Eder et al. | 370/395 |

FOREIGN PATENT DOCUMENTS

| | | | |
|---|---|---|---|
| EP | 1 309 135 A1 | 5/2003 | |
| EP | 1 401 147 | 3/2004 | 12/26 |
| GB | 2 362 538 | 5/2000 | |
| WO | WO 00/72531 | 11/2000 | |
| WO | WO 00/78004 | 12/2000 | |

(56) References Cited

FOREIGN PATENT DOCUMENTS

| WO | WO 02/01413 | 5/2001 | |
|---|---|---|---|
| WO | WO 02/18965 | 3/2002 | ............................ 31/8 |
| WO | WO 03/081451 | 10/2003 | |

OTHER PUBLICATIONS

International Search Report dated Aug. 2, 2005, from related International Application No. PCT/US2004/029554, 6 pages.
Written Opinion of the International Searching Authority dated Aug. 2, 2005 from related International Application No. PCT/US2004/029554, 5 pages.
International Search Report dated Jan. 14, 2005 from corresponding International Application No. PCT/US2004/029553, 4 pages.
Written Opinion of the International Searching Authority dated Jan. 14, 2005 from corresponding International Application No. PCT/US2004/029553, 6 pages.
CIPO Examination Report in related Canadian Patent Application No. 2,534,511 dated May 1, 2006, 4 pages.
Cisco Systems, Inc.; Copyright 1989-1997 © http://www.cisco.com/univercd/cc/td/doc/product/rtrmgmt/sw_ntman/cwsimain/cwsi2/cwsiug2/vlan2/stpapp.htm. "Understanding Spanning-Tree Protocol," Appendix C, pp. C-1 through C-12.
Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.
Liu, Dake, et al, *Configuration-Based Architecture for High Speed and General-Purpose Protocol Processing, Signal Processing Systems*, IEEE, Oct. 20, 1999, pp. 540-547.
D.T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.
Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification & 11 sheets of drawings.
News Release: "Cisco Raises the Bar in Stackable Switching, Introduces Catalyst 3750 Series with Cisco StackWise™ Technology;" 3 pages; http://newsroom.cisco.com/dlls/prod_041503b.html, Apr. 15, 2003.
Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003).
Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.
Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0/7803-5258-0, Feb. 10, 1999, pp. 461-468.
Michael Ward; "802.1S Solves Architecture Issues;" *Network World*, Aug. 4, 2003; 3 pages; http://www.n_wfusion.com/cgi-bin/mailto/x.cgi.
Nortel Networks, "Split Multi-link Trunking," http://www.nortelnetworks.com/corporate/technology/smlt/, pp. 1-2 (printed Jul. 17, 2003).
Nortel Networks, "Split Multi-link Trunking FAQs," http://www.nortelnetworks.com/corporate/technology/smlt/faq.html, pp. 1-3 (printed on Oct. 21, 2003).

\* cited by examiner

| Version 202 |
|---|
| My Device Identifier 204 (ID = X) |
| My Distribution Requirements 206 |
| My Port Priority 208 |
| My Port Identifier 210 |
| My Group Capability 212 |
| My Agport Identifier 214 |
| Your Device Identifier 216 (ID = Y) |
| Your Distribution Requirements 218 |
| Your Port Priority 220 |
| Your Port Identifier 222 |
| Your Group Capability 224 |
| Your Agport Identifier 226 |
| Partner Count 228 |

Port Aggregation Protocol PDU 200
(sent from Interfaces 120(1), 120(2) and 120(3))

FIG. 2

| |
|---|
| Version 202 |
| My Device Identifier 204 (ID = Z) |
| My Distribution Requirements 206 |
| My Port Priority 208 |
| My Port Identifier 210 |
| My Group Capability 212 |
| My Agport Identifier 214 |
| Your Device Identifier 216 (ID = Y) |
| Your Distribution Requirements 218 |
| Your Port Priority 220 |
| Your Port Identifier 222 |
| Your Group Capability 224 |
| Your Agport Identifier 226 |
| Partner Count 228 |
| My Old Device Identifier 410 (ID = X) |

Port Aggregation Protocol PDU
400
(sent from Interfaces 120(2) and 120(3))

FIG. 4

SYSTEM AND METHOD FOR PREVENTING ERRONEOUS LINK AGGREGATION DUE TO COMPONENT RELOCATION

BACKGROUND OF THE INVENTION

1. Field of the Invention

This invention relates to networking and, more particularly, to link aggregation within a network.

2. Description of the Related Art

Link aggregation is used to logically combine two or more individual links into a single aggregated link. Link aggregation can provide improved performance and increased fault tolerance. Improved performance arises because the aggregated link appears to have a bandwidth equal to the combined bandwidth of the individual links. Traffic can be load-balanced among the individual links. Increased fault tolerance is provided since one or more individual links within an aggregated link can fail without disrupting communication between the devices coupled by the aggregated link. Link aggregation techniques include Link Aggregation Control Protocol (LACP), which is defined in IEEE 803.2ad, and Port Aggregation Protocol (PAgP), which is a standard promulgated by CISCO SYSTEMS, INC.

Typically, aggregated links are established between two devices. These devices communicate with each other according to a link aggregation protocol in order to determine whether any of the links between the two devices can be operated as an aggregated link. Typically, communication according to the link aggregation protocol takes place using Protocol Data Units (PDUs). Each device includes an identifier, which uniquely identifies that device for purposes of the link aggregation protocol, in PDUs sent by that device. If a device receives PDUs on two different links, and each of the received PDUs includes the same identifier, the device determines that both links are connected to the same partner device. Accordingly, the device can operate those two links as an aggregated link with the partner device.

In order to provide improved network fault-tolerance, field-replaceable components (i.e., components that can be replaced while the equipment is in the field) are often used within networks. For example, network devices can be implemented with multiple field-replaceable line cards. If one field-replaceable line card fails, that line card can be replaced without having to replace the entire network device. Similarly, in a stackable switch, several switches can be interconnected such that the switches act as a single device. If one switch fails, that switch can be replaced without having to replace the other switches within the stackable switch.

When link aggregation is used with devices that include multiple field-replaceable components and it is desired that links going to different field-replaceable components be able to form aggregated links with each other, all of the field-replaceable components that make up the same device must use the same identifier in aggregation protocol PDUs. Otherwise, a partner device would think that each field-replaceable component was a separate network device, and aggregated links would not be formed for links coupled to different field-replaceable components. Typically, one of the field-replaceable components supplies the identifier to all of the other field-replaceable components.

This above arrangement works well, unless the field-replaceable component supplying the identifier is replaced (e.g., due to a failure within that component). At that point, the remaining field-replaceable components within the device continue to use the identifier supplied by the failed field-replaceable component. If the failed field-replaceable component is repaired and replaced in a different part of the network (and thus is no longer part of the device using the identifier), two different devices, the device that used to include the field-replaceable component, and the field-replaceable component, may inadvertently include the same identifier in link aggregation PDUs. If both devices are coupled to the same partner device, an aggregated link can be formed on links coupled to both devices. Since this aggregated link includes links that terminate on two different devices that are operating independently of each other, improper operation may result. Accordingly, it is desirable to be able to be able to handle situations in which the field-replaceable component supplying the identifier is removed or relocated within the network.

SUMMARY OF THE INVENTION

Various embodiments of methods and systems for preventing erroneous link aggregation due to component relocation are disclosed. Such methods include a method for changing the identifier used by a network device and communicating the identifier change to a peer network device without disrupting an aggregated link.

In some embodiments, a method involves detecting an identifier change and sending a Port Aggregation Protocol (PAgP) protocol data unit (PDU) that includes a new identifier and information. The information indicates the identifier change. The new identifier identifies a network device subsequent to the identifier change.

In one embodiment, the PAgP PDU includes an "old device identifier" field, which is used to convey the information that indicates the identifier change. In this embodiment, the information includes an old identifier, which identified the network device prior to the identifier change. In such an embodiment, a second PAgP PDU can also be sent, prior to the identifier change. The second PAgP PDU does not include the "old device identifier" field.

The method can also involve detecting whether a partner interface is executing a compatible version of PAgP. If the partner interface is not executing the compatible version of PAgP, the compatible version of PAgP can be provided to the partner interface. Alternatively, if the partner interface is not executing the compatible version of PAgP, the partner interface can be inhibited from including a link in an aggregated link.

Another embodiment of a method involves receiving a PAgP PDU, which includes a new identifier, via an interface. In response to the new identifier, the interface is removed from an aggregated interface, unless the PAgP PDU includes information indicating an identifier change.

The received PAgP PDU can include an "old device identifier" field, which includes the information indicating the identifier change. The information indicating the identifier change includes an old identifier, which identifies a network device prior to an identifier change.

Yet another embodiment of a method involves using a first identifier to identify both a first interface of a first component and a second interface of a second component in PAgP PDUs sent via the first interface and the second interface. If the first component is moved to a different location in a network, at least one of the first interface and the second interface is required to use a second identifier in a second PAgP PDU sent via the at least one interface. Causing the interface to use the second identifier can involve prompting a network administrator to enter a media access control (MAC) address for use by the first interface, in response to the first component being moved to a different location in the network. The first interface can then use the new MAC address as the second identifier in the second PAgP PDU sent via the first interface. Alternatively, causing the interface to use the second identifier can involve detecting a trigger condition (such as a failover from the first component to the second component) and causing the second interface to use the second identifier in response to the trigger condition.

Another embodiment of a method involves detecting an identifier change. A network device component is identified by an old identifier prior to the identifier change. The network device component is identified by a new identifier subsequent to the identifier change. A link aggregation protocol PDU that is sent subsequent to the identifier change includes an "old device identifier" field dedicated to conveying the old identifier. The "old device identifier" field can be encoded as a Type, Length, and Value (TLV), such that a type portion of the TLV identifies that the TLV is an old device identifier field. The method can also involve sending a second link aggregation protocol PDU, prior to the identifier change, that does not include the "old device identifier" field.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 2 shows the contents of a Port Aggregation Protocol Packet (PAgP) packet that is sent when an identifier change has not been detected, according to one embodiment of the present invention.

FIG. 4 shows a PAgP packet that is sent when an identifier change has been detected, according to one embodiment of the present invention.

Figure 1:
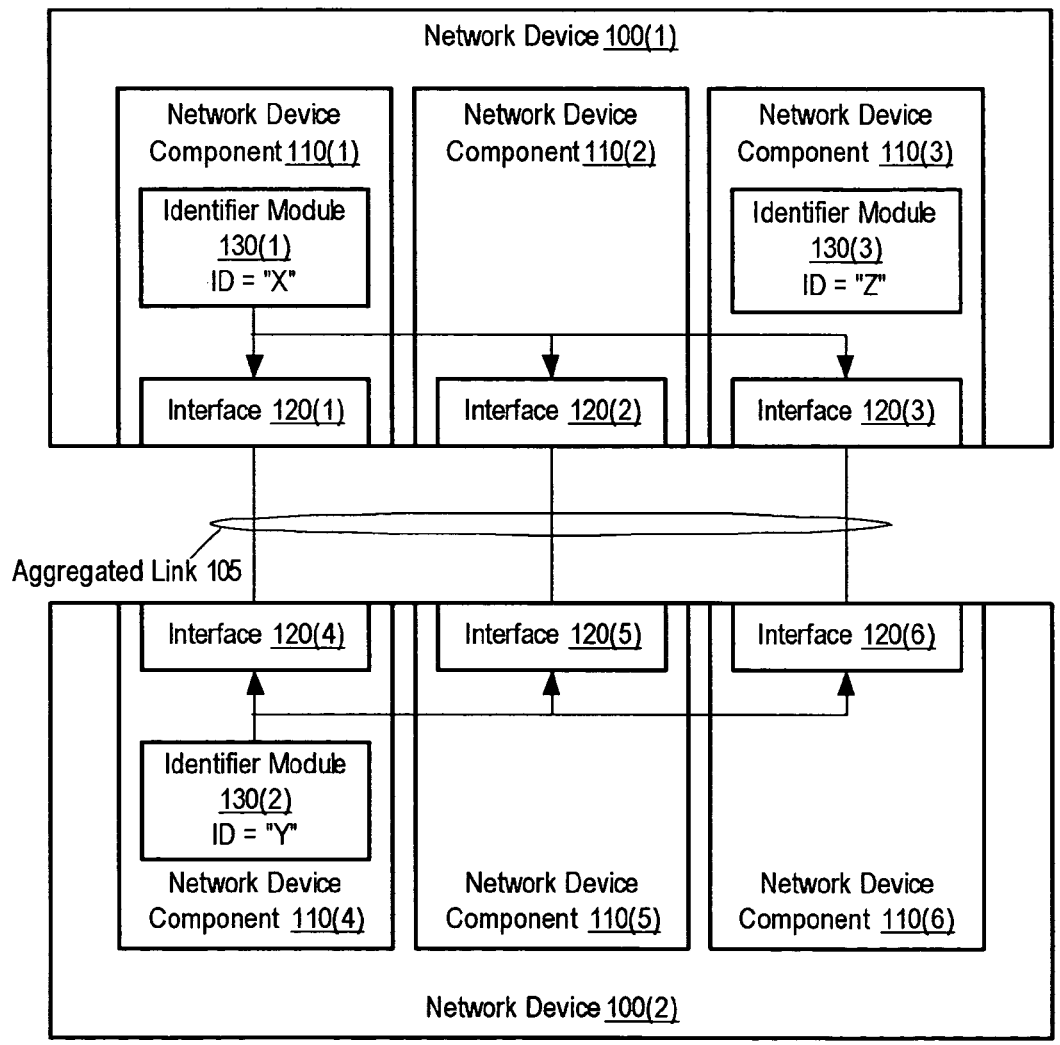
FIG. 1 shows two network devices that are connected by an aggregated link, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a system in which two network devices, network device 100(1) and network device 100(2), are coupled by aggregated link 105. Each network device 100(1) and 100(2) is one of several different types of network devices, including switches, routers, bridges, gateways, stackable switches, virtual network devices, adjunct network devices, and the like.

Network device 100(1) includes three network device components 110(1)-110(3). Similarly, network device 100(2) includes three network device components 110(4)-110(6). Each network device component 110(1)-110(6) is a component (e.g., a line card, a virtual network device sub-unit (as described below), a chassis useable within a stackable switch, or the like) that can be removed and/or replaced independently of the other network device components. For example, if network device component 110(2) experiences a failure, network device component 110(2) can be removed from network device 100(1) for repair or replacement. The removal of network device component 110(2) does not necessitate the removal of network device components 110(1) and 110(3) from network device 100(1). It is noted that in other embodiments, each network device coupled by an aggregated link can include fewer or additional network device components than the network devices shown in FIG. 1. Additionally, the number of network device components within each network device can vary among network devices (e.g., one network device can include eight network device components, while another network device includes four network device components).

Each network device component includes an interface (it is noted that each network device component can include several other interfaces as well). Network device component 110(1) includes interface 120(1), network device component 110(2) includes interface 120(2), and network device component 110(3) includes interface 120(3). Interfaces 120(1)-120(3) are interfaces of network device 100(1). Network device component 110(4) includes interface 120(4), network device component 110(5) includes interface 120(5), and network device component 110(6) includes interface 120(6). Interfaces 120(4)-120(6) are interfaces of network device 100(2). Each interface 120(1)-120(6) can be a physical interface or logical interface.

Aggregated link 105 link includes three links (these links can be physical or logical links). One link couples interface 120(1) to interface 120(4). Another link couples interface 120(2) to interface 120(5). The third link couples interface 120(3) to interface 120(6).

Interfaces that are included within the same network device and that are coupled to links within the same aggregated link are described as being part of an aggregated interface. Thus, interfaces 120(1)-120(3), which are each coupled to a link within aggregated link 250 and are each included within network device 100(1), form an aggregated interface. Network device 100(1) can use this aggregated interface in the same way as the network device would use a normal, non-aggregated interface. Similarly, network device 100(2) operates interfaces 120(4)-120(6) as an aggregated interface.

In this example, the network devices 100(1) and 100(2) use Port Aggregation Protocol (PAgP) to form aggregated links. Network devices 100(1) each send PAgP protocol data units (PDUs) to each other in order to determine whether any of the links between the two network devices can be combined into an aggregated link. Each PAgP PDU includes an identifier that uniquely identifies the network device that sent that PAgP PDU. Within network device 100(1), identifier module 130(1) of network device component 110(1) supplies an identifier "X" to each of the interfaces 120(1)-120(3) within network device 100(1). Interfaces 120(1)-120(3) include identifier X in each PAgP PDU sent by those interfaces. Similarly, identifier module 130(2) of network device component 110(4) supplies an identifier "Y" to each interface 120(4)-120(6) of network device 100(2). Interfaces 120(4)-120(6) include identifier Y in each PAgP PDU sent by those interfaces.

As shown in FIG. 1, a single identifier module (e.g., identifier module 130(1) in network device 100(1)) supplies the identifier used by all network device components for which link aggregation is desired. This way, those network device components will all use the same identifier in PAgP PDUs. It is noted that each network device can include more than one identifier module, but only one identifier module will supply identifiers to interfaces at any given time. For example, network device 100(1) also includes identifier module 130(3) (which is part of network device component 130(3)). Identifier module 130(3) is capable of supplying identifier "Z" to one or more of interfaces 120(1)-120(3). In one embodiment, each network device component includes an identifier module. When the network device is initialized, one network device component within the network device is selected to provide the identifier to each interface within the network device for which link aggregation is desired.

Each identifier module 130(1)-130(3) is a part of a network device component that is capable of being the source of a unique identifier. In one embodiment, identifier modules supply media access control (MAC) addresses for use as identifiers. If the network device components are each line cards, the identifier modules can be read-only memories (ROMs) on each of the line cards. The ROMs store the MAC address of each line card. Alternatively, if each network device component is a virtual network device sub-unit, each identifier module can be a backplane. It is noted that other alternatives can be used to supply identifiers such as MAC addresses.

FIG. 2 illustrates some of the fields that can be included in a PAgP PDU. As shown, PDU 200 includes Version field 202, My Device Identifier field 204 ("My" refers to the device sending the PAgP PDU), My Distribution Requirements field 206, My Port Priority field 208, My Port Identifier field 212, My Group Capability field 212, My Agport (Aggregated Port) Identifier field 214, Your Device Identifier field 216 ("Your" refers to the device to which the PAgP PDU is being sent), Your Distribution Requirements field 218, Your Port Priority field 220, Your Port Identifier field 222, Your Group Capability field 224, Your Agport Identifier field 226, and Partner Count field 228.

Version field 202 is used to convey a value that identifies the version and/or type of PAgP PDU 200. My Device Identifier field 204 is used to convey a value that identifies the sending network device. My Distribution Requirements field 206 and My Port Priority field 208 are used to convey information that can be used (by the network device that receives PAgP PDU 200) to determine how data frames are distributed among an aggregated interface. A value (e.g., a port number) included in My Port Identifier field 212 identifies the individual interface (e.g., one of interfaces 120(1)-120(3) of FIG. 1) that sent PAgP PDU 200. My Group Capability field 212 is used to convey a value that indicates whether the sending interface can be aggregated with certain other types of interfaces. My Agport (Aggregated Port) Identifier field 214 is used to convey a value that identifies whether the sending interface has been added to an aggregated interface and, if so, which aggregated interface includes the sending interface.

Your Device Identifier field 216, Your Distribution Requirements field 218, Your Port Priority field 220, Your Port Identifier field 222, Your Group Capability field 224, and Your Agport Identifier field 226 are used to convey values that have been obtained from PAgP PDUs received by the sending interface. For example, when the interface that sends PAgP PDU 200 receives a PAgP PDU, the values of the My Device Identifier field, My Port Priority field, My Port Identifier field, My Group Capability field, and My Agport Identifier field in the received PAgP PDU are respectively used as the values of Your Device Identifier field 216, Your Distribution Requirements field 218, Your Port Priority field 220, Your Port Identifier field 222, Your Group Capability field 224, and Your Agport Identifier field 226 in PDU 200. Accordingly, fields 216-226 are used to convey values related to the peer interface to which the sending interface is coupled. Partner Count field 228 is used to convey information that indicates the number of devices and/or interfaces to which the interface that sent PAgP PDU 200 is currently coupled.

PDU 200 is an example of a PAgP PDU sent from one of the interfaces in network device 100(1), as shown in FIG. 1. Accordingly, the value of My Device Identifier field 204 is X and the value of Your Device Identifier field 216 is Y. It is noted that PAgP PDUs sent from other network devices include similar fields; however, the value of each field will differ depending on the sending network device (e.g., the value of My Device Identifier Field 204 in a PAgP PDU sent by network device 100(2) is Y).

Figure 3:
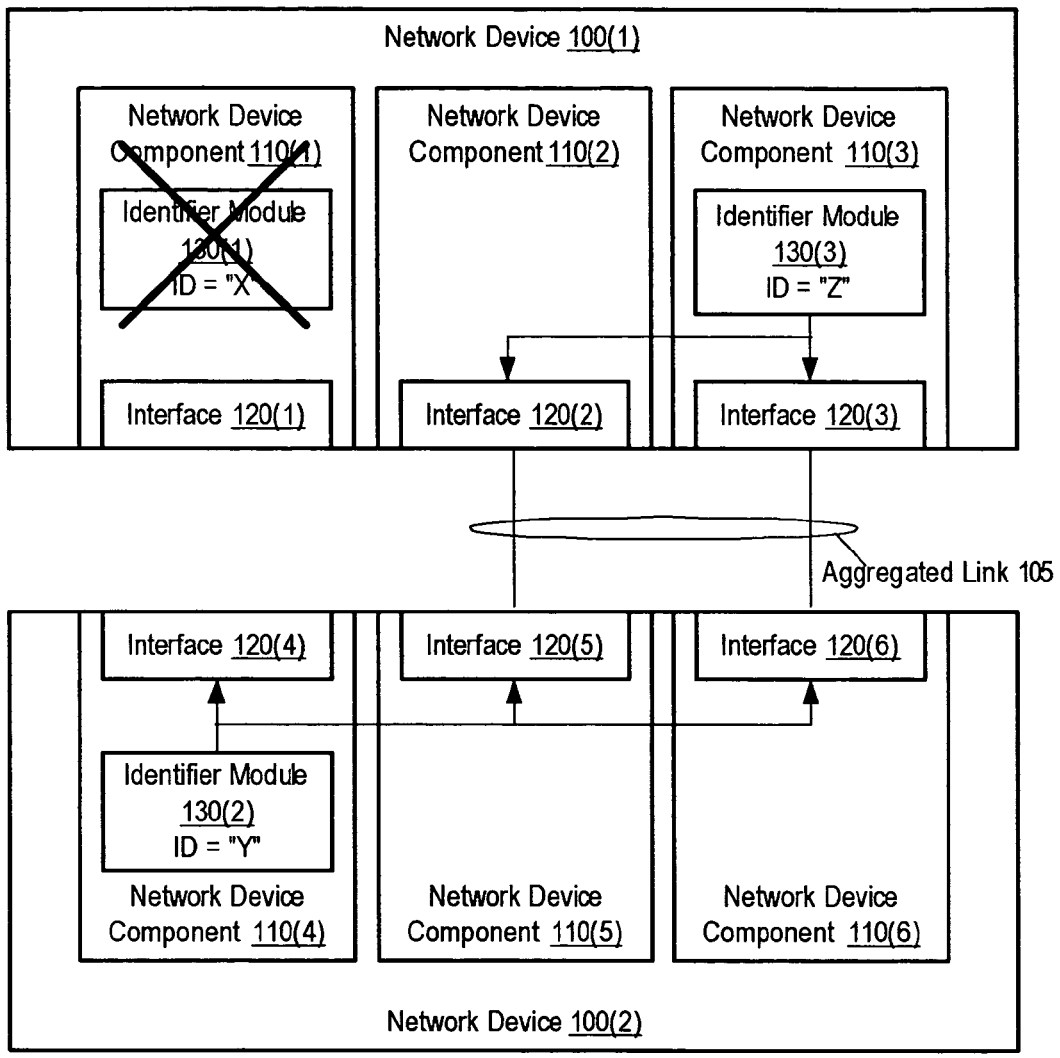
FIG. 3 shows the failure of a component of one of the network devices in the system of FIG. 1.

FIG. 3 illustrates the system of FIG. 1. As shown, network device component 110(1) has experienced a failure (as indicated by the large "X"). As a result of the failure, network device component 110(1) is unable to communicate via interface 120(1). Interface 120(4) detects the failure of network device component 110(1) (e.g., due to communications between interfaces 120(1) and 120(4) timing out) and removes interface 120(4) from the aggregated interface that includes interfaces 120(5) and 120(6).

In response to detecting the failure of network device component 110(1), the other network device components 110(2) and 110(3) within network device 100(1) initiate an identifier change in order to change the identifier (the value of My Device Identifier field 204) that interfaces 120(2) and 120(3) use to identify network device 100(1) when sending PAgP PDUs. Network device components 110(2) and 110(3) then select one network device component to supply the new identifier to each interface in network device 100(1) for which aggregation is desired. In this example, network device component 110(3) has been selected, and thus identifier module 130(3) supplies the new identifier, "Z", to interfaces 120(2) and 120(3).

After the identifier change occurs, interfaces 120(2) and 120(3) use the new identifier Z as the value of My Device Identifier field 204 in subsequent PAgP PDUs. Interfaces 120(2) and 120(3) also include another field, having the old identifier X as a value, in each subsequent PAgP PDU. After the identifier change has been communicated to interfaces 120(5) and 120(6) in network device 100(2), interfaces 120(2) and 120(3) can return to sending PAgP PDUs (e.g., such as the PDU illustrated in FIG. 2) that do not include the additional field. It is noted that interfaces 120(2) and 120(3) may not be provided with the new identifier Z at the same time, and thus the times at which interfaces 120(2) and 120(3) begin using identifier Z in PAgP PDUs may differ with respect to each other.

Interfaces 120(5) and 120(6) receive PAgP PDUs from interfaces 120(2) and 120(3) respectively. Normally, when an interface receives a PAgP PDU in which the value of the My Device Identifier field differs from the value of that field in the most recently received PDU, the receiving interface will be removed from the aggregated interface in which the receiving interface is included. However, the first time that an interface receives a PAgP PDU that includes the additional field, the receiving interface determines that an identifier change has occurred at the sending interface. Based on this determination, the receiving interface will compare the old identifier value (conveyed in the additional field of the received PAgP PDU) to the identifier value currently used to identify the sending device. If these two identifier values match, the receiving interface determines that, while the sending interface is now using a new identifier in PAgP PDUs, no configuration changes have occurred that would make it necessary to remove the receiving interface from an aggregated interface. Accordingly, interfaces 120(5) and 120(6) will not be removed from the aggregated interface in response to the identifier change at network device 100(1). Accordingly, aggregated link 105 is not disrupted by the identifier change.

FIG. 4 illustrates more detail of a PAgP PDU 400 that can be sent from interfaces 120(2) and 120(3) when the identifier change from X to Z occurs. As shown, PAgP PDU 400 includes the same fields 202-228 as PAgP PDU 200 of FIG. 2. PAgP PDU 400 also includes an additional field, My Old Device Identifier field 410. The value of My Old Device Identifier field 410 indicates the device identifier that was used by the sending device prior to an identifier change. The value of My Device Identifier field 204 indicates the device identifier that is used by the sending device subsequent to the identifier change. In this example, the value of fields 204 and 410 are the values that interfaces 120(2) and 120(3) use after the identifier change from X to Z, as shown in FIG. 3. Thus, the value of My Device Identifier field 204 is Z and the value of My Old Device Identifier Field 410 is X.

In some embodiments, My Old Device Identifier field 410 (and each other field within PAgP PDU 400) is encoded as a type, length, and value (TLV). The value of the type portion of the TLV indicates the type of field (e.g., My Old Device Identifier field). The value of the length portion of the TLV indicates the length of the field. The value portion of the TLV is used to convey the contents of the field. Thus, if the type portion of the TLV identifies the My Old Device Identifier field, the value portion of the TLV has a value indicating the old identifier used by the sending device prior to an identifier change. In some embodiments in which My Old device Identifier field 410 is implemented as a TLV, My Old Device Identifier field 410 (and any other TLVs in PAgP PDU 400) comes after the non-TLV parts of the PAgP PDU (as shown in FIG. 4). By placing the new TLV at the end of the PAgP PDU, the original format of the PAgP PDU is preserved, providing backward compatibility with prior versions of PAgP. For example, network devices that do not support the My Old Device Identifier field TLV can ignore the portions of the PAgP PDU that come after the portion of the PAgP PDU that are recognized by those network devices.

By using an additional field to convey the old identifier (e.g., as opposed to using an existing field for this purpose), PAgP PDU 400 indicates that an identifier change has occurred at the sending device while also providing all of the other information typically included in a PAgP PDU. Accordingly, the use of an additional field allows the sending device to continue to provide all of the PAgP information that would normally be provided in a PAgP PDU. This in turn avoids potential problems or disadvantages that might arise in situations in which an additional field was not used to convey the old identifier. For example, if an existing field (such as Your Device ID field) of the PAgP PDU shown in FIG. 2 were used to convey the old identifier (e.g., by setting that field to an invalid value), less than all of the information required by PAgP will be conveyed to the receiving device. Accordingly, the receiving device will not be able to perform all of the checks required by PAgP. For example, if the Your Device ID field was used to convey the old identifier, the receiving device would not be able to ascertain whether the link on which the PDU was received was operating as a bidirectional link. Accordingly, use of the additional field within PAgP PDU allows the identifier change to be communicated to the receiving device without affecting the robustness of the PAgP protocol exchange.

In some situations, the device that sends a PAgP PDU having an additional field is coupled to a device that does not recognize the additional field (e.g., the receiving device may be compatible with an earlier version of PAgP that does not support the use of the additional field for the old identifier). In such a situation, the receiving device ignores the additional field (e.g., the receiving device can be configured to ignore all TLVs in a PAgP PDU having unknown "type" values). As a result of receiving the PAgP PDU, the receiving interface will be removed from an aggregated interface, since the value of My Device Identifier field 204 will be different that the value of that field in a previously received PAgP PDU. Once all of the interfaces coupled to the sending device have received a PAgP PDU that includes the new value of the My Device Identifier field 204, those interfaces will reform the aggregated interface. This behavior is the same behavior that would result if no additional field were used at all. Accordingly, the use of the additional field provides backward-compatibility with earlier versions of PAgP.

It is noted that if an additional field is not used (e.g., if another field, which is already defined as conveying information other than an old identifier) to convey the old identifier, compatibility problems may arise. For example, if Your Device Identifier field 216 is used to convey the old identifier, and if the receiving device is compatible with an earlier version of the protocol, the receiving device will remove the receiving interface from an aggregated interface. Because the value of the field being used to convey the old identifier will not be a valid value, the receiving device will not reform the aggregated interface until the receiving device receives a PDU in which that field is no longer being used to convey the old identifier (i.e., the receiving device will not be able to reform the aggregated interface until that field again has a valid value, as defined by the earlier version of the protocol used by the receiving device). Accordingly, it may take longer for the receiving device to reform the aggregated interface than it would take if an additional identifier had been used to convey the old identifier.

In some embodiments, different network devices execute different versions of PAgP. For example, one network device can execute a version of PAgP that supports My Old Device Identifier field 410, while another network device executes an earlier version of PAgP that does not support Old Device Identifier field 410 (such a version of PAgP is referred to herein as an incompatible version). A network device that supports the later versions of PAgP can be configured to detect whether a peer network device is executing a compatible version of PAgP (e.g., by examining the value of Version field 202 in PDUs received from the peer device). In one embodiment, if the network device detects that peer network device is not executing a compatible version of PAgP, the network device prevents any aggregated links from being formed between the network device and the peer network device. For example, each interface within the network device that is coupled to the peer network device can send PAgP PDUs that use different values of My Device Identifier field 204. In another embodiment, if the network device detects that peer network device is not executing a compatible version of PAgP, the network device provides a compatible version of PAgP to the peer network device. For example, the network device can send the peer network device one or more packets, each containing program instructions executable to implement the compatible version of PAgP.

While the above example describes using an additional field within a PAgP PDU to communicate an identifier change, identifier changes can also be communicated by using an additional field within PDUs used by other link aggregation protocols. For example, an additional TLV, dedicated to conveying an old identifier, can be defined for use in Link Aggregation Control Protocol (LACP) by adding a new type to the approved types of TLVs useable in LACP PDUs.

Figure 5:
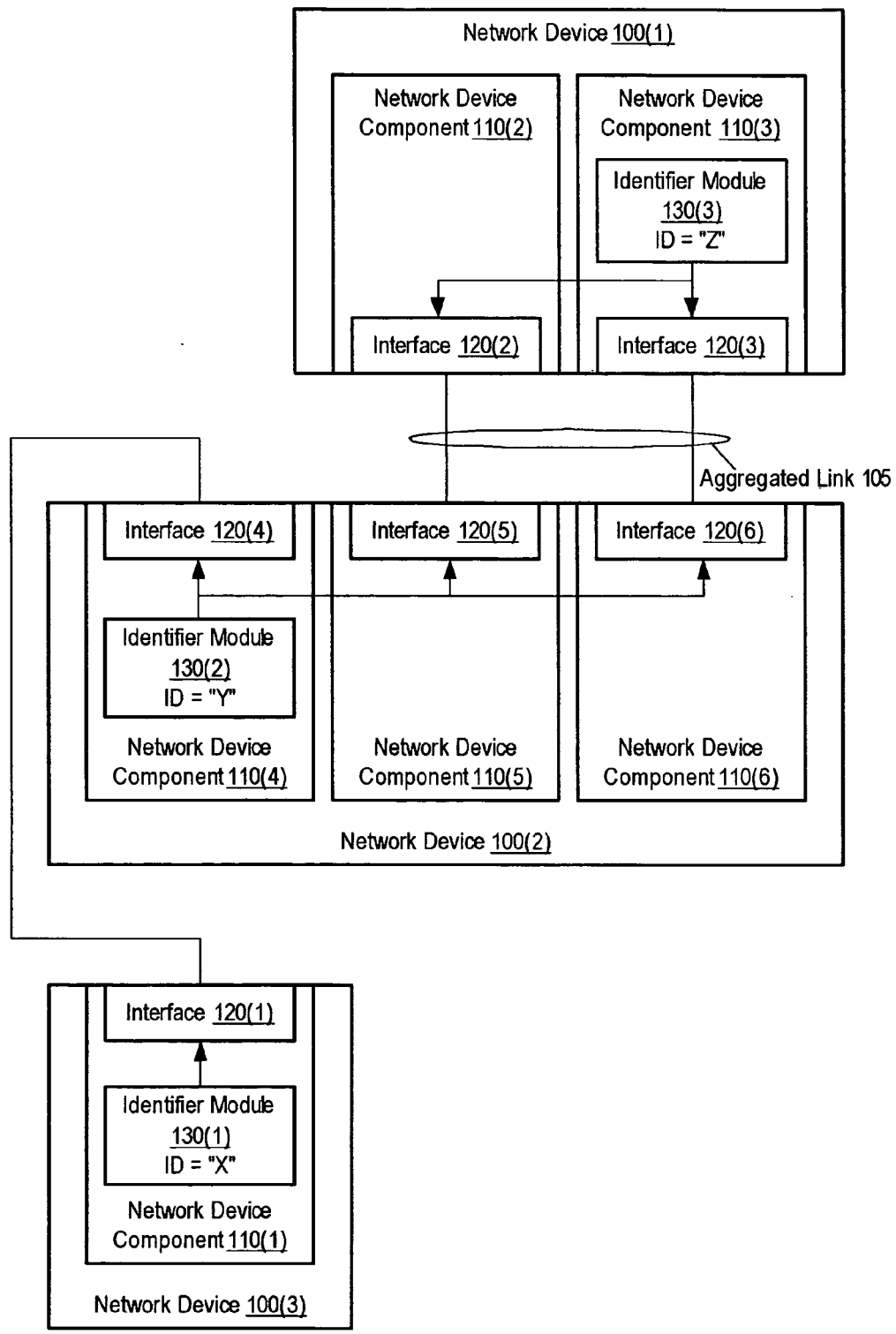
FIG. 5 shows the system of FIG. 3 after an identifier change has occurred and the failed component has returned to the network.

FIG. 5 shows the system of FIG. 2 after network device component 110(1) has been repaired and replaced within the network. As shown, when network device component 110(1) is replaced, network device component 110(1) is not part of network device 100(1). Instead, network device component 110(1) has been replaced at a different location within the network, as part of network device 100(3). Interface 120(1) of network device 100(3) is coupled to interface 120(4) of network device 100(2).

Interfaces, such as interface 120(1), within network device 100(3) use identifier X, as provided by identifier module 130(1), as the value of the My Device Identifier field of each PAgP PDU sent by those interfaces. If interfaces in network device 100(1) were still using identifier X in PAgP packets, interfaces 120(4) could erroneously form an aggregated interface with interfaces 120(5) and 120(6). However, as a result of the identifier change, interfaces 120(2) and 120(3) are no longer using identifier X to identify network device 100(1) in PAgP PDUs. Accordingly, when network device component 110(1) is replaced and resumes use of identifier X in PAgP PDUs, aggregation errors will not occur.

Figure 6:
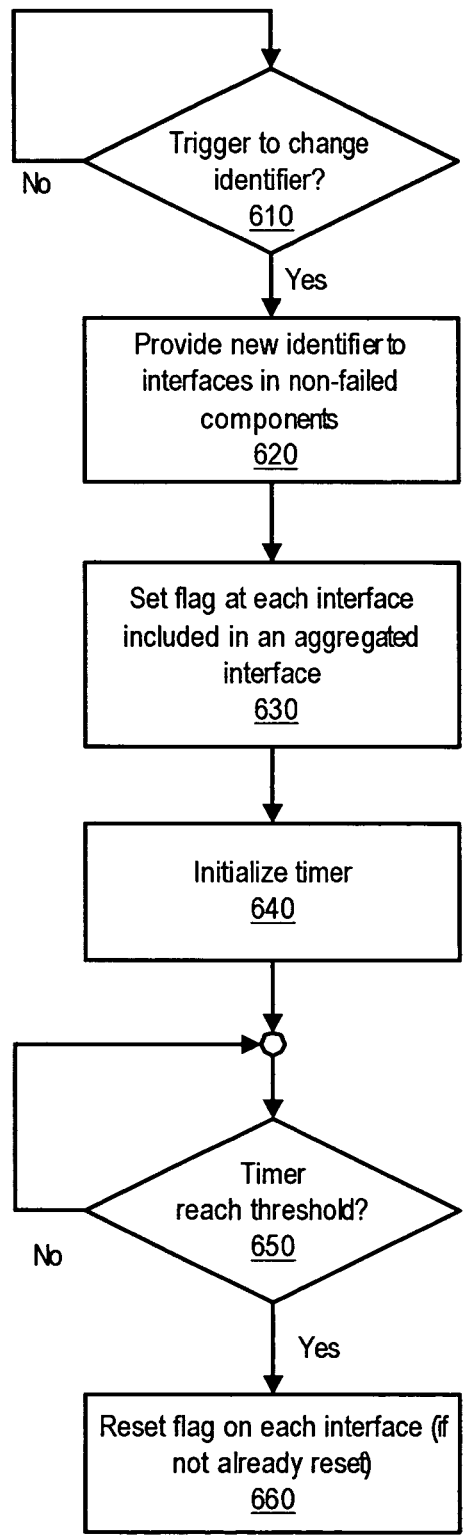
FIG. 6 is a flowchart of a method performed when an identifier change is detected, according to one embodiment of the present invention.

FIG. 6 is a flowchart of a method performed when an identifier change is detected. At 610, a trigger to change the identifier (e.g., a component failure) is detected. For example, the trigger can be the failure of the network device component that provided the identifier used as the value of My Device Identifier in PDUs sent by interfaces within a network device. The trigger is detected by one or more other network device components included within that network device.

In response to the trigger, a new identifier is provided to each of the interfaces in the non-failed components within the network device, as indicated at 620. For example, in response to detecting the failure of a line card within a network device, another line card can supply a MAC address from that line card's ROM to each of the other non-failed line cards. When an interface receives the new identifier (e.g., via a packet or control bus), the interface updates a register (or other data store, such as a location in RAM) to store the new identifier. The interface also saves, at least temporarily, the old identifier to another register (or other data store).

In one embodiment, the network device includes several network device components. One of the network device components operates as a master or primary device, and this network device component controls certain aspects of the operation of the other, non-primary network device components. The network device component that is operating as the primary device supplies the identifier used by all of the network device components in link aggregation. If the primary device fails (e.g., as detected at 610), another network device component is promoted and becomes the primary device. This device then supplies the new identifier at 620.

Figure 7:
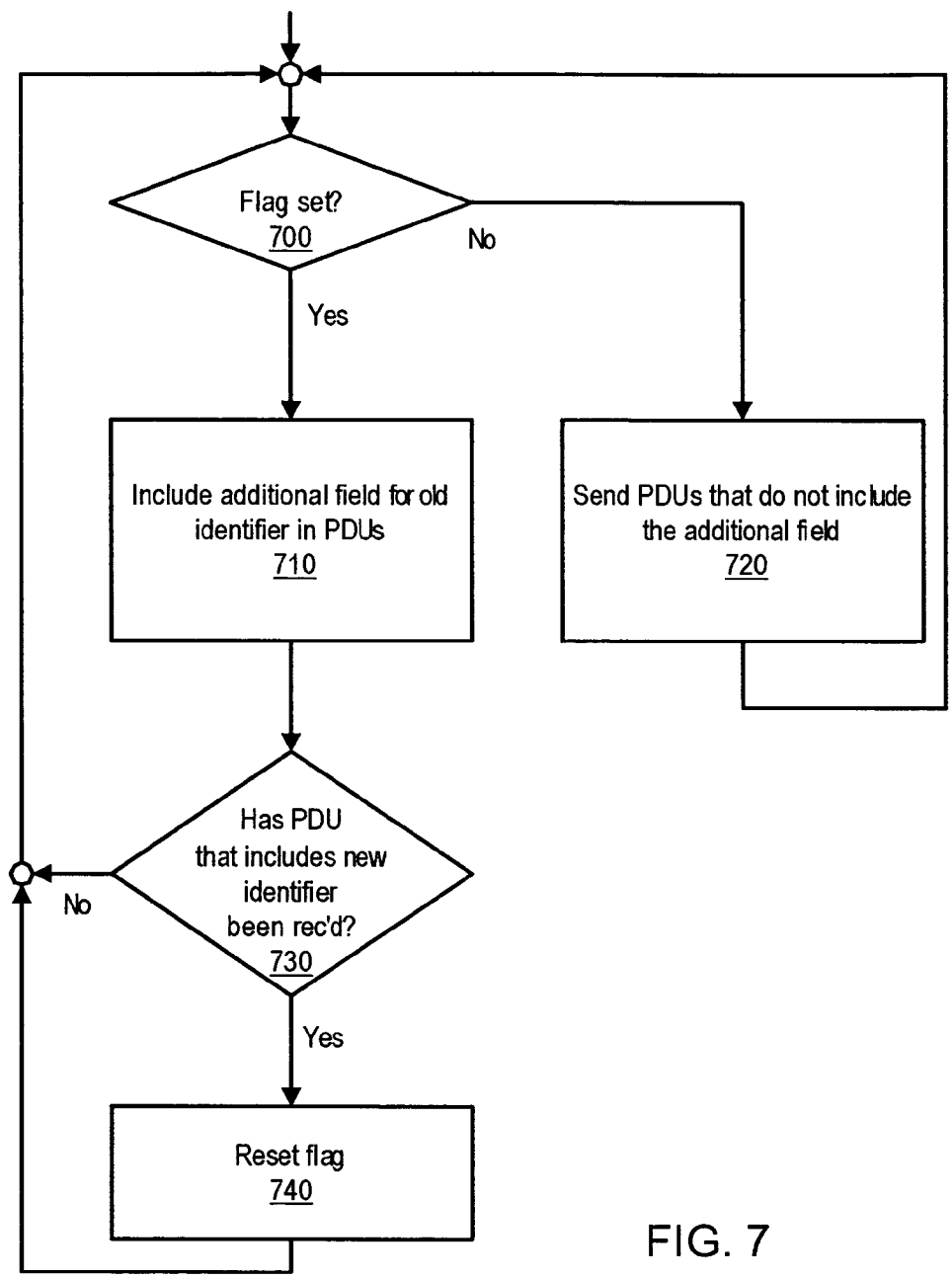
FIG. 7 is a flowchart of another method performed when the identifier change is detected, according to one embodiment of the present invention.

At 630, a flag (e.g., a single bit of a register) is set on each interface that is included in an aggregated interface. The flags for each interface are set independently, in some embodiments (e.g., each interface sets a respective flag in response to updating the register that stores the device identifier). When the flag associated with a particular interface is set, that interface will send PDUs that include an additional field, which is used to convey the old identifier (as shown in FIG. 7). When the flag is not set, the interface will send PDUs that do not include the additional field. It is noted that interfaces within the same network device component can be sending different versions of PDUs at the same time. For example, an interface can be sending PDUs that do not include the additional field at the same time as another interface is sending PDUs that do include the additional field.

A timer is initialized, as shown at 640. Initializing the timer can involve setting the timer to an initial value (e.g., 30 seconds) and then starting the timer. The value used can be selected in order to give the identifier change a reasonable amount of time to be communicated to a peer device. In one embodiment, the timer is set to a value that corresponds to three hello periods in the protocol. If the timer has reached a threshold (e.g., 0 if the timer is counting down), the flag is reset, as shown at 650 and 660. The flag remains set until the timer reaches the threshold. It is noted that other embodiments use a counter (e.g., incremented each time a packet is sent) or other means for controlling how long the flag is set instead of a timer.

FIG. 7 is a flowchart of another method performed by an interface. If the flag associated with the interface is set (e.g., due to performance of the method of FIG. 6), the interface sends one or more PDUs that include an additional field (e.g., My Old Device Identifier), in which the old identifier (the identifier used by the interface prior to the identifier change) is conveyed, as indicated at 700-710. These PDUs also include a field (e.g., My Device Identifier) that stores the new device identifier (used by the interface subsequent to the identifier change). If the flag is not set, the interface sends PDUs that do not include the additional field, as shown at 700 and 720. In one embodiment, the interface is configured to send a PDU on a regular schedule (e.g., as determined by a timer or counter). If the flag is set when the scheduled time to send a PDU arrives, the interface will send a PDU that includes the additional field. Otherwise, the interface will send a PDU that does not include the additional field.

While the flag is set, the interface analyzes incoming PDUs to see if the peer device has recognized the identifier change, as indicated. For example, the interface can compare the value of the Your Device Identifier field of incoming PDUs to the new identifier value. If these two values are the same, it indicates that the peer interface has recognized the identifier change. Accordingly, if the interface receives a PDU that includes the new identifier, as indicated at 730, the interface resets the flag, as shown at 740. This in turn causes the interface to stop sending PDUs that include the additional field to the peer interface. If a PDU that includes the new identifier has not been received, the interface will continue sending PDUs that include the additional identifier until the flag is reset (e.g., as determined by the use of a timer or counter in the method of FIG. 6). It is noted that, while the flag is set, the interface will not be removed from the aggregated interface in response to receiving a PDU that uses the old identifier (e.g., as conveyed in the Your Device Identifier field of the received PDU).

Figure 8:
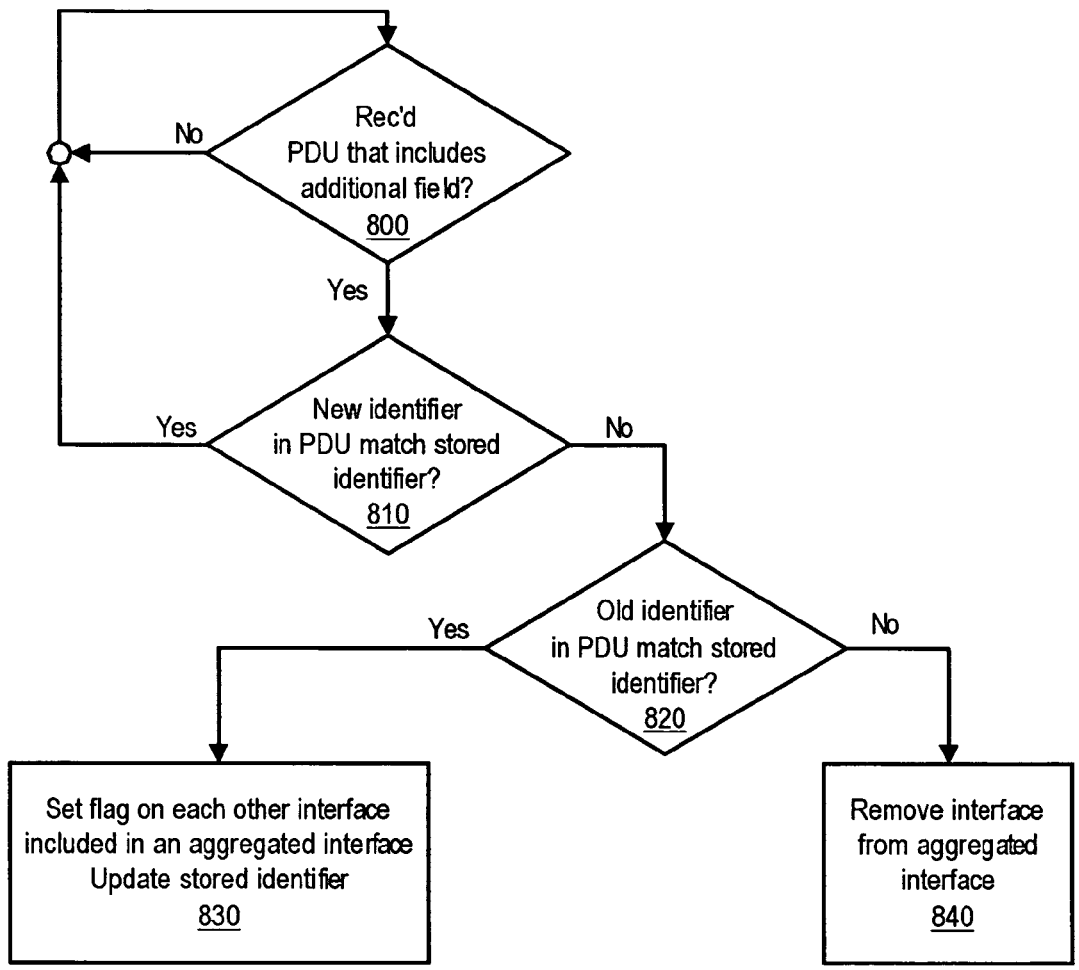
FIG. 8 is a flowchart of a method performed by an interface that receives an indication that an identifier change has occurred at a peer interface, according to one embodiment of the present invention.

FIG. 8 illustrates a flowchart of a method used by an interface that receives a PDU that includes an indication that an identifier change has occurred at the peer interface. In this example, the indication that the identifier change has occurred is the presence of the additional field, used to convey an old identifier, within a received PDU. This example shows how, if a received PDU includes the additional field, the receiving interface will not automatically be removed from an aggregated interface in response to the device identifier in the received PDU not matching a stored device identifier. Instead, the receiving interface is only removed from the aggregated interface if neither the device identifier nor the old device identifier included in the received PDU match the stored device identifier.

If a PDU that includes the additional field used to convey an old identifier is received, as detected at 800, the interface compares the device identifier (e.g., the value of the My Device Identifier field) conveyed in the PDU to a stored device identifier, as shown at 810. For example, the interface can compare the value of the My Device Identifier field of the received PDU to a value stored in a register (e.g., this register can be used to supply the value of the Your Device Identifier field of PDUs sent by the interface). If the values are equal, the interface determines that the identifier change has already been recognized by the interface and that no further action as required.

Figure 9:
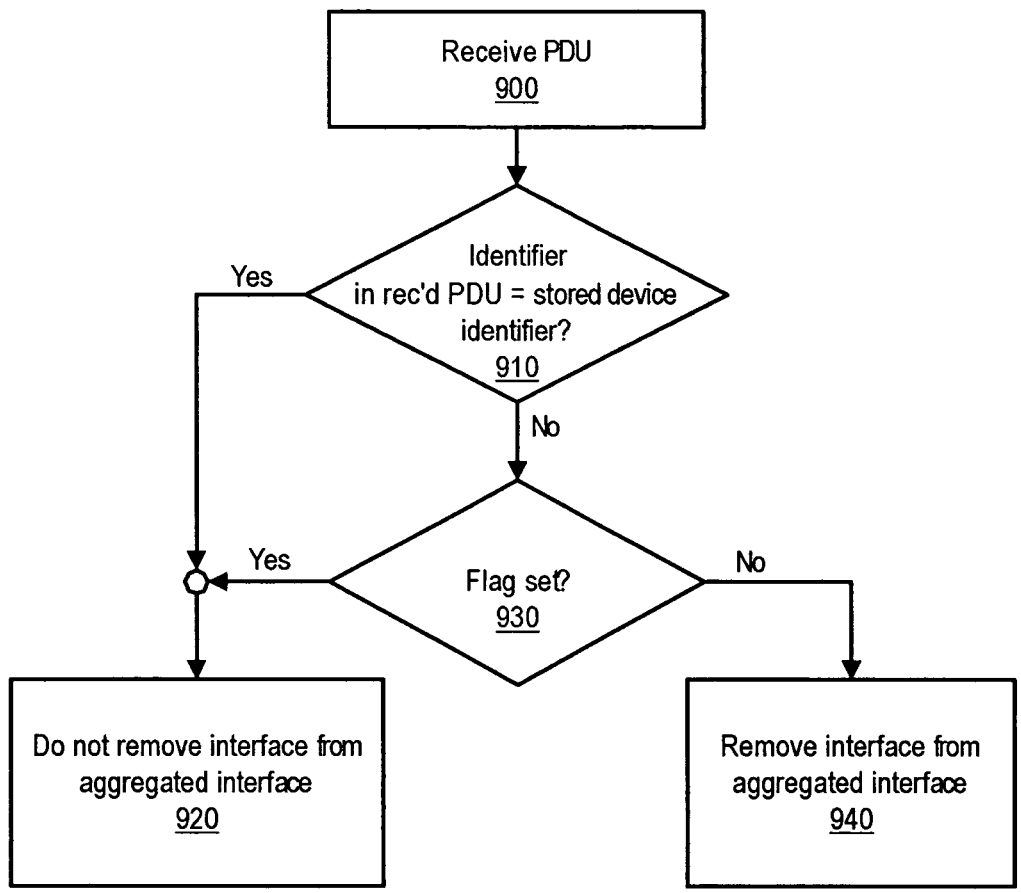
FIG. 9 is a flowchart of a method performed by an interface that has detected an identifier change at a peer interface, according to one embodiment of the present invention.
Figure 10:
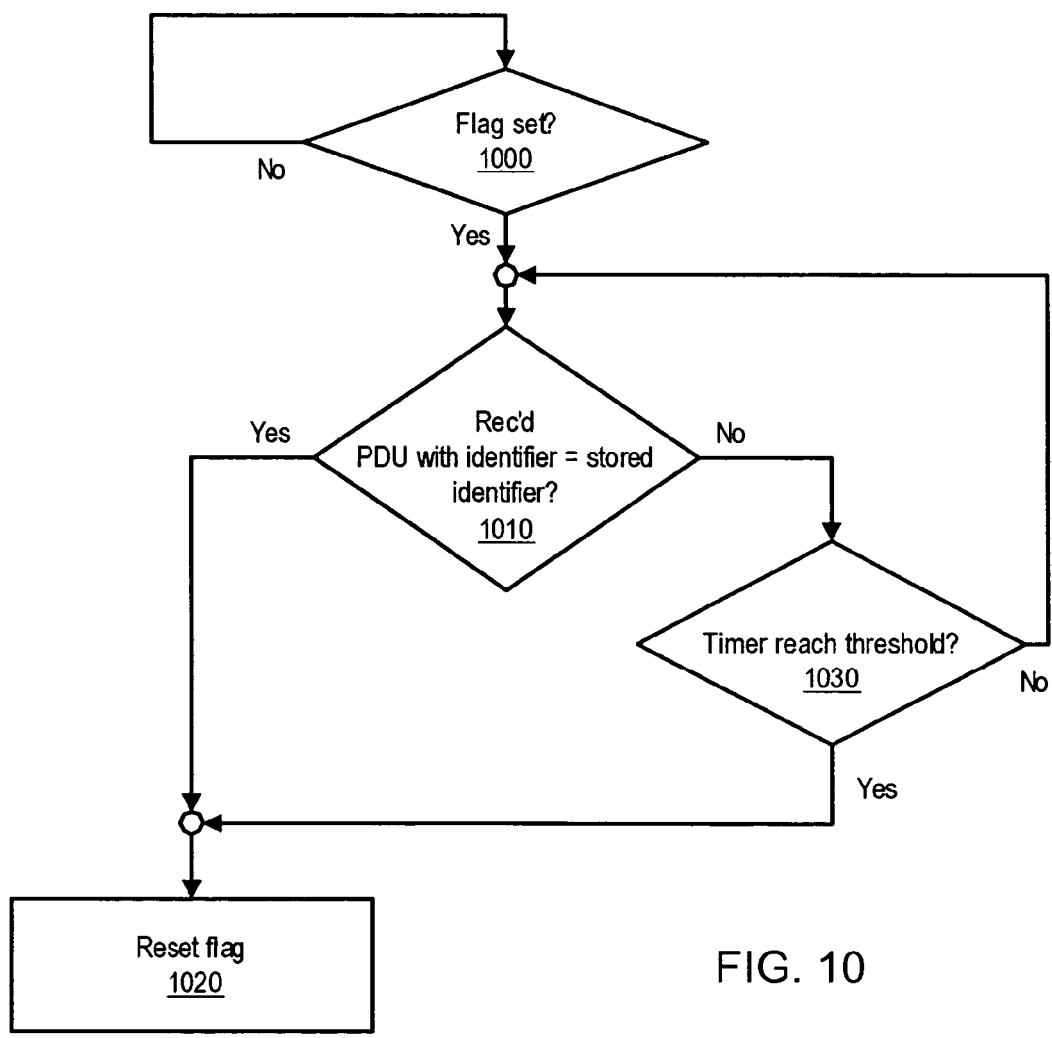
FIG. 10 is a flowchart of a method for controlling when the flag (referred to in FIGS. 8 and 9) is reset, according to one embodiment of the present invention.

If the values are unequal, the interface compares the old identifier (the value of the additional field in the received PDU) to the stored device identifier, as indicated at 820. If these values are equal, the interface determines that an identifier change has just occurred at the peer interface. The identifier change resulted in the device identifier used by the peer interface changing from the old identifier (the value of the additional field) to the new identifier included in the PDU (e.g., the value of the My Device Identifier field of the PDU). In response to the values being equal (as determined at 820), the interface sets a flag on each other interface (if any) that is included in the same aggregated interface as the interface, as shown at 830. This flag indicates that an identifier change has occurred on the peer device (it is noted that the flag referred to in FIGS. 8, 9, and 10 is a different flag than the flag referred to in FIGS. 6 and 7). The interface also updates the stored device identifier, on all interfaces within the aggregated interface, to equal the new device identifier (e.g., the value of the My Device Identifier field) in the received PDU. If the old identifier in the received PDU does not match the stored device identifier and the receiving interface is included in an aggregated interface, the interface is removed from the aggregated interface, as shown at 820 and 840.

FIG. 9 shows how the flag referred to in FIG. 8 is used to control how an interface, which is included in an aggregated interface, handles received PDUs that do not include the additional field used to convey the old identifier. The interface receives a PDU, at 900. The interface compares a stored device identifier (which indicates the device identifier used by a peer interface) to the device identifier used in the received PDU. As shown at 910 and 920, if the interface receives a PDU that includes a device identifier (e.g., the value of the My Device Identifier field) that is equal to the stored device identifier, then the receiving interface is not removed from the aggregated interface. Similarly, if the device identifier in the received PDU does not match the stored device identifier, and if the flag is set (indicating that an identifier change at the sending device has occurred), the interface is not removed from the aggregated interface, as indicated at 920 and 930. If values do not match and the flag is not set, however, the interface is removed from the aggregated interface, as shown at 930 and 940.

FIG. 10 shows how the flag can be reset. If the flag is set, and if a PDU containing a device identifier (e.g., the value of the My Device Identifier field) that matches the stored identifier is received, as determined at 1000 and 1010, the flag is reset, as indicated 1020. Otherwise, the flag remains set until a timer expires, as indicated at 1030 and 1020. It is noted that a counter (e.g., counting the number of received PDUs) can be used instead of a timer when determining whether to reset the flag.

It is noted that the new interfaces can join an aggregated interface while the flag is set to indicate that an old identifier has been received (an interface is a "new" interface with respect to the aggregated interface if that interface was not part of the aggregated interface prior to detection of the peer's identifier change by the aggregated interface). An interface will be added to the aggregated interface based on a comparison of the value of the new device identifier (e.g., the value of the My Device Identifier field) in a PDU received by that interface to the stored device identifier maintained by the interfaces in the aggregated interface. The new interface will not be added to the aggregated interface if the old device identifier in a PDU received by the new interface matches the stored device identifier.

While the example of FIGS. 1, 2, 3, 4, 5, 6, 7, 8, 9, and 10 describes an embodiment in which there are two different types of PDUs (one that includes an additional field for an identifier, and one that does not include the additional field), it is noted that in other embodiments, all PDUs include a field dedicated to conveying the old identifier, if any, used by interfaces prior to an identifier change. In these embodiments, if an interface has not undergone an identifier change, the value of the field used to convey the old identifier can be set to an invalid or null value. Additionally, in such an embodiment, an additional field and/or value can be used to indicate that a new identifier change has occurred. For example, a portion of the field used to convey the old identifier can be used as a flag to indicate that an identifier change has occurred. This flag can be set when the interface detects an identifier change and reset either after the peer interface acknowledges the identifier change or after a prespecified interval elapses or after a prespecified number of PDUs have been sent.

Figure 11:
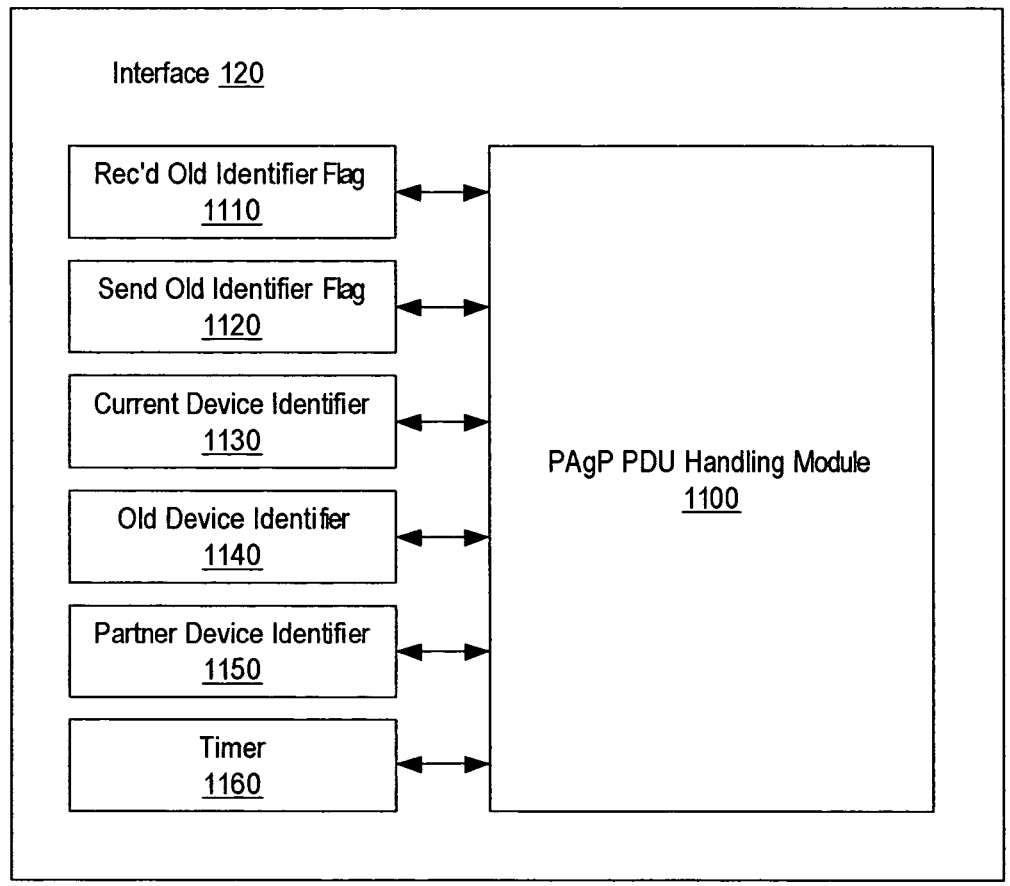
FIG. 11 is a block diagram of an interface that performs methods like those shown in FIGS. 6, 7, 8, 9, and 10, according to one embodiment of the present invention.

FIG. 11 shows a block diagram of an interface configured to perform methods similar to the method of FIGS. 6, 7, 8, 9, and 10. As shown, interface 120 (which can represent any of interfaces 120(1)-120(6) of FIG. 1) includes PAgP PDU handling module 1100. Interface 120 also includes storage for various variables 1110-1160, including Received (Rec'd) Old Identifier flag 1110, Send Old Identifier flag 1120, Current Device Identifier 1130, Old Device Identifier 1140, Partner Identifier 1150, and timer 1160.

PAgP PDU handling module 1100 is configured to perform methods similar to those shown in FIGS. 6, 7, 8, 9, and 10 for PAgP PDUs received by interface 120. While performing such methods, PAgP PDU handling module 1100 accesses variables 1110-1160 in order to make various determinations (e.g., timer 1160 determines whether a flag should be reset). It is noted that interface 120 can be implemented in hardware, software, or a combination of hardware and software. For example, PAgP PDU handling module 1100 can be implemented in an application specific integrated circuit (ASIC). Variables 1110-1160 can be stored in registers internal to the ASIC in such an embodiment.

Received Old Identifier flag 1110 indicates whether interface 120 has received a PAgP PDU that includes an indication, such as the presence of the additional field used to convey the old device identifier, that an identifier change has occurred at the interface that sent the PAgP PDU. For example, Received Old Identifier flag 1110 can be the flag referred to in FIGS. 8, 9, and 10. PAgP PDU handling module 1100 sets Received Old Identifier flag 1110 in response to receiving a PAgP PDU that includes an indication that an identifier change has occurred at the sending interface (i.e., the interface that sent the PAgP PDU to interface 120). PAgP handling module 1100 can reset Received Old Identifier flag 1110 in response to the expiration of a counter or timer (e.g., timer 1160).

Send Old Identifier flag 1120 indicates whether interface 120 should send a PAgP PDU that includes an indication (e.g., the presence of an additional field used to convey an old identifier) that an identifier change has occurred at interface 120. For example, in one embodiment, Send Old Identifier flag 1120 is the flag referred to in FIGS. 6 and 7. PAgP PDU handling module 1100 sets Send Old Identifier flag 1120 in response to a change in the device identifier used by interface 120. PAgP PDU handling module 1100 resets Send Old Identifier flag 1120 in response to the expiration of a counter or timer (e.g., timer 1160), in response to sending a certain number of PDUs that include the indication that the identifier change has occurred, or in response to receiving a PAgP PDU that includes the new device identifier.

The value of Current Device Identifier 1130 indicates the device identifier currently used by interface 120. For example, interface 120 uses the value of Current Device Identifier 1130 as the value of the My Device Identifier field in PAgP PDUs sent by interface 120. When the value of Current Device Identifier 1130 changes and interface 120 is part of an aggregated interface, PAgP PDU handling module 1100 sets Send Old Identifier Flag 1120.

The value of Old Device Identifier 1140 indicates the device identifier used by interface 120 prior to an identifier change. PAgP PDU handling module 1100 writes the value of Current Device Identifier to Old Device Identifier 1140 prior to modifying Current Device Identifier 1130. When Send Old Identifier flag 1120 is set, PAgP PDU handling module 1100 uses the value of Old Device Identifier 1140 as the value of the My Old Device Identifier field in PAgP PDUs sent by interface 120.

The value of Partner Device Identifier 1150 indicates the value that a peer interface coupled to interface 120 uses as a device identifier (e.g., as obtained from the My Device Identifier field of a PAgP PDU received by interface 120). Whenever interface 120 receives a PAgP PDU from a peer interface, PAgP handling module 1100 compares the value of the My Device Identifier field in the received PAgP PDU to the value of Partner Device Identifier 1150. If the values do not match, and if the received PAgP PDU does not include a My Old Device Identifier field, PAgP PDU handling module 1100 removes interface 120 from an aggregated interface (if any) in which interface 120 is included. If the values do not match and the received PAgP PDU does include the My Old Device Identifier field, PAgP PDU handling module 1100 compares the value of the My Old Device Identifier field to the value of Partner Device Identifier 1150. If the values match, PAgP PDU handling module 1100 sets Received Old Identifier flag 1110 on all other interfaces within the same aggregated interface as interface 120. If the values do not match, PAgP PDU handling module 1100 removes interface 120 from the aggregated interface that includes interface 120.

It is noted that the program instructions executable to implement PAgP PDU handling module 1100 can be stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, a computer readable medium is a carrier medium such as a network and/or a wireless link upon which signals such as electrical, electromagnetic, or digital signals, on which the data and/or instructions are conveyed.

Alternative Implementations

FIGS. 1, 2, 3, 4, 5, 6, 7, 8, 9, 10, and 11 provide a variety of examples of methods and systems that prevent erroneous link aggregation from occurring due to component relocation. In particular, the methods and systems described above prevent erroneous link aggregation (e.g., as would occur if two devices used the same identifier to identify themselves in PAgP PDUs) by changing the identifier used by a network device for link aggregation whenever the network device component that supplies that identifier experiences a failure. It is noted that other techniques can also be employed to prevent erroneous link aggregation from occurring due to component relocation. For example, in one embodiment, whenever a network device component is installed within a network, that network device component prompts an administrator for a locally administered MAC address. Thus, the administrator will be prompted for a locally administered MAC address the first time the network device component is installed in the network and each subsequent time that the network device component is reinstalled (at the same location or at a different location) within the network. When the administrator is prompted for the locally administrated MAC address, the administrator will be prompted to enter a MAC address that has not previously been used by the network device component. The network device component can then use the entered MAC address in PAgP PDUs. Accordingly, each time the network device component is moved, the network device component will begin using a different MAC address to identify the network device component in PAgP PDUs.

In general, the techniques described herein involve situations in which an interface of a first network device component and an interface of a second network device component both use the same identifier in link aggregation PDUs. If the first network device component is moved to a different location in the network, at least one of the first network device component and the second network device component will be required to use a different identifier in link aggregation PDUs.

For example, the network device component that was moved can be configured to prompt an administrator for a new identifier when the network device component is reinstalled. Alternatively, the network device component that remains in place can undergo an identifier change, as described with respect to FIGS. 1, 2, 3, 4, 5, 6, 7, 8, 9, 10, and 11.

Virtual Network Device

Figure 12:
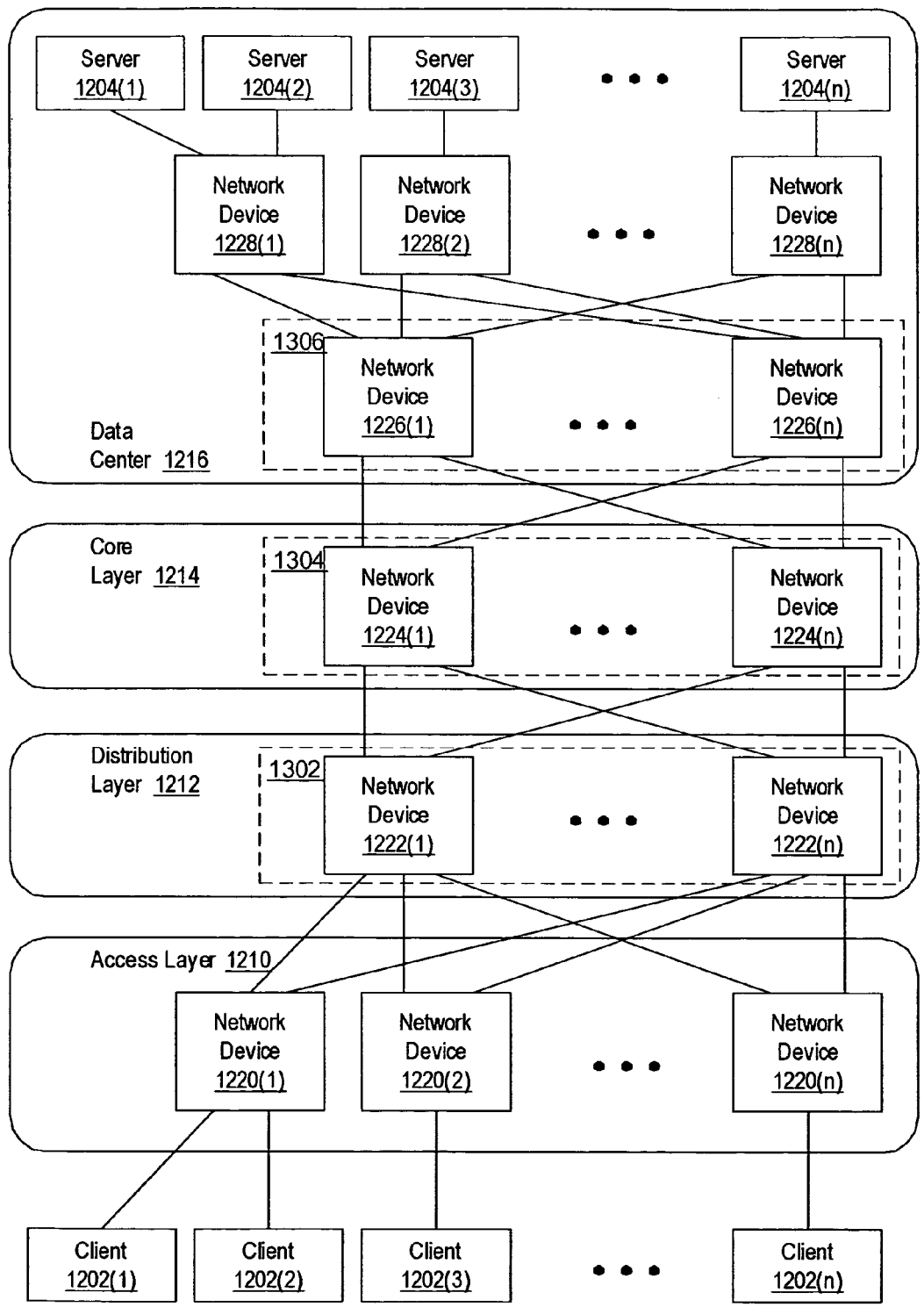
FIGS. 12, 13A, 13B, and 14 illustrate an example of a virtual network device that employs the methods shown in FIGS. 6, 7, 8, 9, and 10.

FIGS. 12, 13A, 13B, and 14 provide an example of an environment that includes network devices that use the above-described techniques to change the identifier used to identify a network device for purposes of link aggregation. FIG. 12 is a block diagram of a network that includes several virtual network devices. In FIG. 12, several clients 1202(1)-1202(n) communicate with each other and with several servers 1204(1)-1204(n) via a network. Clients 1202(1)-1202(n) can include a variety of different devices that access networked services. For example, client 1202(1) can be a cell phone, client 1202(2) can be a personal computer, and client 1202(n) can be a Personal Digital Assistant (PDA). Servers 1204(1)-1204(n) provide various services, such as various software-based services and/or access to shared storage devices.

The network coupling clients 1202(1)-1202(n) and servers 1204(1)-1204(n) is described in terms of several network layers. The layer closest to clients 1202(1)-1202(n) is access layer 1210. Access layer 1210 includes several network devices 1220(1)-1220(n). In this example, access layer 1210 is the primary layer at which packets enter the network from clients 1202(1)-1202(n).

Distribution layer 1212 aggregates flows received via access layer 1210 and provides these aggregated flows to core layer 1214. In this example, distribution layer 1212 includes network devices 1222(1)-1222(n). Core layer 1214 is a logically centralized portion of the network through which various aggregated flows pass. Core layer 1214 includes network devices 1224(1)-1224(n).

In this example, data center 1216 includes two sets of network devices: network devices 1226(1)-1226(n) and network devices 1228(1)-1228(n). Network devices 1228(1)-1228(n) provide access to the network to various servers 1204(1)-1204(n). Network devices 1226(1)-1226(n) aggregate flows from network devices 1228(1)-1228(n) and provide the aggregated flows to core layer 1214.

It is noted that in some embodiments, networks will not include the network layers illustrated in FIG. 12 (e.g., some of the layers can be combined and/or eliminated, and alternative layers can also be included in addition to and/or instead of those shown in FIG. 12). Additionally, clients and servers can be coupled to the network differently than shown in FIG. 12 (e.g., some clients and/or servers can be coupled to individual network devices in the core and/or distribution layers). Additionally, the physical locations of devices relative to each other can differ from the logical locations shown in FIG. 12. For example, two devices in the same network layer can be physically located on different floors, in different buildings, or on different campuses. In contrast, two devices in different network layers can be located in the same room.

In some embodiments, network devices 1220(1)-1220(n) and 1228(1)-1228(n), which are located at the outer edges of the network, operate differently than network devices 1222 (1)-1222(n), 1224(1)-1224(n), and 1226(1)-1226(n), which are located in the inner layers of the network. For example, in one embodiment, network devices 1220(1)-1220(n) are adjunct network devices that are controlled or otherwise subordinate to network devices in the inner layers (e.g., the distribution and core layers) of the network. In such an embodiments, the non-adjunct network devices provide L2 (Layer 2) and L3 (Layer 3) forwarding and routing, while adjunct network devices only have relatively limited forwarding and/or routing capabilities. In other embodiments, adjunct network devices do not perform any L2 forwarding or L3 routing. Instead, the adjunct network devices simply forward all packets to non-adjunct network devices for L2 forwarding and L3 routing. In some embodiments, non-adjunct network devices, coupled to adjunct network devices, control the operation of the adjunct network devices. In some embodiments, adjunct network devices are treated as remote line cards of the network devices to which the adjunct network devices are subordinate. It is also noted that in alternative embodiments, non-adjunct network devices are used in the access layer and data center instead of adjunct network devices.

Network devices 1220(1)-1220(n), 1222(1)-1222(n), 1224 (1)-1224(n), 1226(1)-1226(n), and 1228(1)-1228(n) can include various routers, switches, gateways, and other network equipment. In many embodiments, only one network device may be needed at each layer in order for the network to function. However, multiple network devices can be included at each layer, as shown in FIG. 12, in order to provide redundancy.

It will be noted that the variable identifier "n" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., the number of network devices in each network layer may vary). Rather, in each instance of use, the variable identified by "n" (or any other such identifier) may hold the same or a different value than other instances of the same variable identifier.

Multiple links are implemented between devices in different network layers to provide additional redundancy. For example, as shown in FIG. 12, each network device 1220(1)-1220(n) in access layer 1210 is coupled to distribution layer 1212 by two (or more) different links. Similarly, each network device 1222(1)-1222(n) in distribution layer 1212 is coupled to core layer 1214 by two (or more) different links. In one embodiment, each link is an Ethernet link.

Figure 13A:
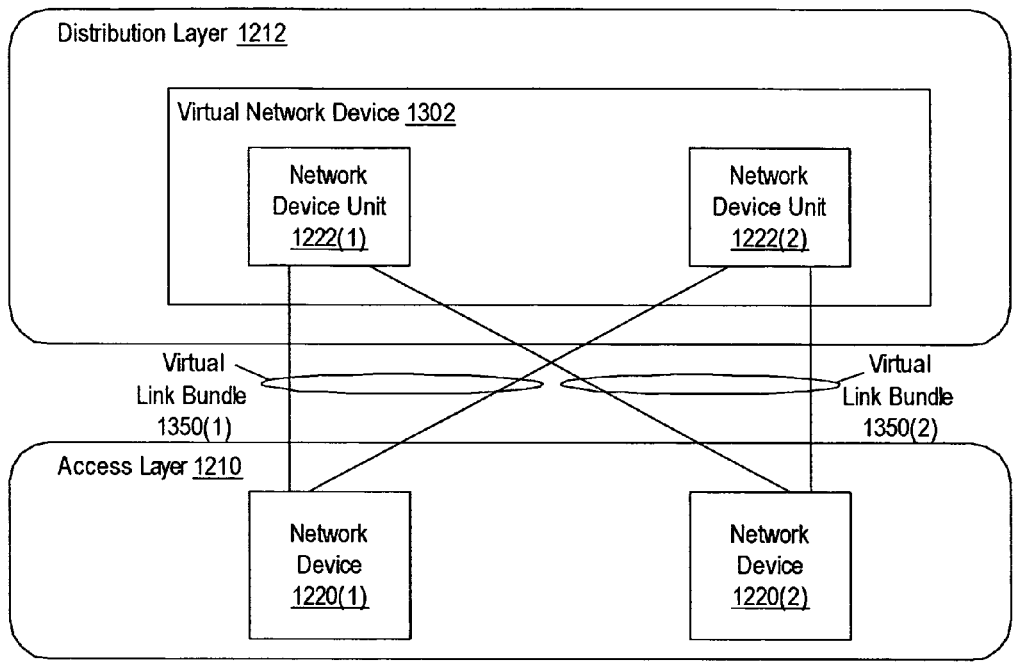
Figure 13B:
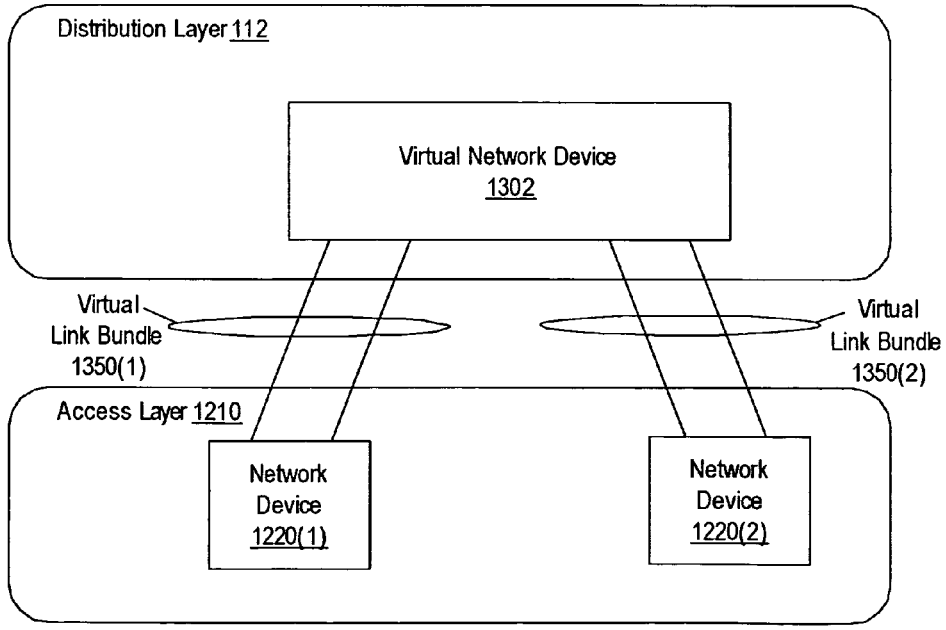
Figure 14:
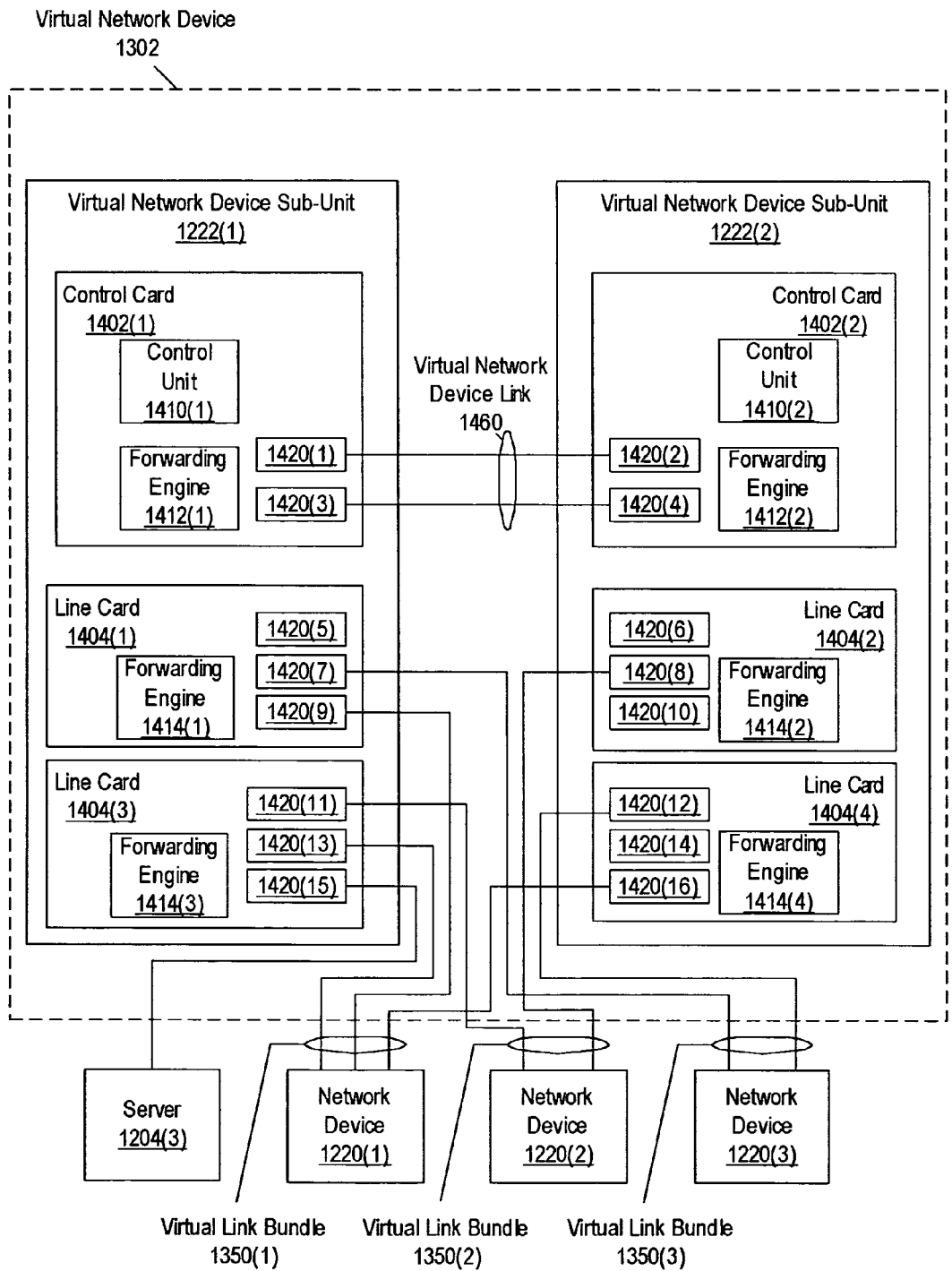

Within each network layer, multiple redundant network devices are configured to collectively operate as a single virtual network device. For example, as shown in FIG. 12, two or more network devices in distribution layer 1212 operate as a virtual network device 1302. Similarly, two or more of network devices 1224(1)-1224(n) operate as a single virtual network device 1304, and two or more of network devices 1226(1)-1226(n) operate as a single virtual network device 1306. More details of how two distribution-layer network devices collectively operate as a distribution-layer virtual network device 1302 are shown in FIGS. 13A, 13B, and 14. Virtual network devices can be coupled to other virtual network devices, to network devices, and/or to clients and/or servers by virtual link bundles, as described below. In general, any multi-ported device (whether a physical device, such as a network device, client, or server, or a virtual network device) can be coupled to a virtual network device by a virtual link bundle that includes several links, some of which terminate on different sub-units within the virtual network device.

FIG. 13A shows an example of a network in which there are two network devices 1220(1) and 1220(2) in access layer 1210. There are also two network devices 1222(1) and 1222

(2) in distribution layer 1212. These two network devices 1222(1) and 1222(2) operate as a single virtual network device 1302 in this example. Each network device 1220(1)-1220(2) is coupled to distribution layer 1212 by two links. In this example, each of those two links is coupled to a different one of network devices 1222(1) and 1222(2). This provides redundancy, allowing network devices 1220(1) and 1220(2) to continue to communicate with distribution layer 1212 even if one of network devices 1222(1) or 1222(2) fails or if one of the links between a given access-layer network device and a given distribution-layer network device fails.

The redundant links coupling each of network devices 1220(1) and 1220(2) to virtual network device 1302 can be operated as a single logical link, referred to herein as a virtual link bundle. Network device 1220(1) operates the two links coupling network device 1220(1) to virtual network device 1302 as a virtual link bundle 1350(1). In such an embodiment, each interface in network device 1220(1) that is coupled to one of the links is included in an interface bundle, which corresponds to virtual link bundle 1350(1). Network device 1220(2) similarly operates the two links coupling network device 1220(2) to virtual network device 1302 as virtual link bundle 1350(2).

In some embodiments, virtual link bundles 1350(1) and 1350(2) are each aggregated links formed by exchanging PAgP PDUs. Network devices 1222(1) and 1222(2) use the same identifier to identify themselves in PAgP PDUs. For example, network device 1222(1) can provide an identifier (e.g., a MAC address) to network device 1222(2). If network device 1222(1) fails, network device 1222(2) can use the above-described techniques to change the identifier used by network device 1222(2) in PAgP PDUs.

As shown in FIG. 13A, each virtual link bundle 1350(1) and 1350(2) includes links that terminate at different network devices in distribution layer 1212. For example, virtual link bundle 1350(1) couples network device 1220(1) to both network device 1222(1) and network device 1222(2). This differs from conventional implementations in which logical links are only allowed between a single pair of network devices.

In some embodiments, network devices 1220(1) and 1220(2) are aware (e.g., through various state information maintained within each network device) that each virtual link bundle 1350(1) and 1350(2) includes links that are terminated on different network devices in distribution layer 1212. In such an embodiment, network devices 1220(1) and 1220(2) can select a link within a particular virtual link bundle on which to send a packet based on this awareness.

In other embodiments, network devices 1222(1) and 1222(2) operate to conceal the fact that such a single logical link actually includes links that are terminated at different network devices. For example, as shown in FIG. 13A, network devices 1222(1) and 1222(2) operate as a single virtual network device 1302. FIG. 13B illustrates how, from the perspective of network device 1220(1) in access layer 1210, network device 1220(1) is coupled to a single network device, virtual network device 1302, in distribution layer 1212 by a redundant pair of links. Network device 1220(2) has a similar perspective of virtual network device 1302.

FIG. 13B illustrates another embodiment of the present invention. In FIG. 13B, network devices 1220(1) and 1220(2) operate in the same manner that those network devices would operate if connected to a single network device. By operating in this manner, the use of a virtual link bundle is simplified. For example, if network device 1220(1) is aware that virtual link bundle 1350(1) terminates at two different network devices, network device 1220(1) selects a link on which to send a particular packet based on Spanning Tree Protocol. The use of Spanning Tree Protocol may involve more overhead and/or be more restrictive with respect to which links can be used to send a given packet (e.g., Spanning Tree Protocol might block all but one of the links, preventing utilization of all but one non-blocked link) than if network device 1220(1) simply views virtual network device 1302 as a single entity. When viewing virtual network device 1302 as a single entity, for example, network device 1220(1) simply select a link on which to send a packet based on load-sharing constraints. Similarly, if a link within virtual link bundle 1350(1) fails, there is no need for network device 1220(1) to change how Spanning Tree Protocol is applied. Instead, network device 1220(1) simply continues to use the non-failed links within virtual link bundle 1350(1).

The individual network devices, such as network device 1222(1) and 1222(2), included in virtual network device 1302 are each referred to herein as a "virtual network device sub-unit". In some embodiments, virtual network device sub-units 1222(1) and 1222(2) are each implemented in a separate chassis (i.e., each chassis houses a single virtual network device sub-unit). For example, in FIG. 13A, network devices 1222(1) and 1222(2) can each be implemented in a separate chassis. Even if virtual network device sub-units 1222(1) and 1222(2) share a chassis, each virtual network device sub-unit can be made to operate as an independent network device, allowing one virtual network device sub-unit to continue operating if the other virtual network device sub-unit(s) in the virtual network device fail. For example, virtual network device sub-unit 1222(1) and virtual network device sub-unit 1222(2) can be in the same chassis, but each virtual network device sub-unit can have independent hardware, ports, uplink interfaces, and power supplies, and each can be removed from the chassis independently of the other. If virtual network device sub-unit 1222(1) fails (e.g., due to a power supply failure or a software error), virtual network device sub-unit 1222(2) can continue to run. In such an embodiment, virtual network device sub-unit 1222(1) can be removed for repair or replacement without disrupting the operation of virtual network device sub-unit 1222(2).

In some embodiments, the links in a virtual link bundle coupling a network device to an adjunct network device are specialized links, referred to herein as uplinks, that are used to couple an adjunct network device to a virtual network device. Each uplink can convey both a packet and additional information generated within one of the network devices. For example, in one embodiment, if a packet is being conveyed on an uplink from an access-layer adjunct network device to a distribution-layer network device, additional information conveyed on the uplink with the packet includes information identifying which of the adjunct network device's ports received the packet. The additional information also includes information indicating whether any forwarding or routing has already been performed on the packet by the sending device. In some embodiments, use of uplinks allows a virtual network device to control adjunct network devices that are coupled to that virtual network device. The use of uplinks also facilitates the virtual network device being able to perform routing and/or forwarding for subordinate adjunct network devices. An interface within a network device or adjunct network device that is coupled to an uplink is referred to herein as an uplink interface.

FIG. 14 shows more detail within each network device included in a virtual network device. Here, virtual network device 1302 includes two virtual network device sub-units 1222(1) and 1222(2). It is noted that in other embodiments, virtual network device 1302 includes more than two component network devices. In this example, virtual network device 1302 is located at the distribution layer of the network. However, similar virtual network devices can be implemented in other network layers (e.g., within the data center and/or core layer).

Virtual network device 1302 is coupled to several access-layer network devices 1220(1)-1220(3). Network devices 1220(2) and 1220(3) are each coupled to virtual network device 1302 by two uplinks, one to each virtual network device sub-unit 1222(1) and 1222(2). Network device 1220 (2) is coupled to virtual network device by virtual link bundle 1350(2), and network device 1220(3) is coupled to virtual network device 1302 by virtual link bundle 1350(3). As a result, network devices 1220(2) and 1220(3) continues to communicate with the distribution layer even if one of these uplinks and/or one of virtual network device sub-units 1222 (1) and 1222(2) fail. Network device 1220(1) is coupled to virtual network device 1302 by three uplinks: two uplinks to virtual network device sub-unit 1222(1) and one uplink to virtual network device sub-unit 1222(2). These three uplinks collectively form virtual link bundle 1350(1). Network device 1220(1) continues to communicate with the distribution layer even if two of the three uplinks and/or one of virtual network device sub-units 1222(1) and 1222(2) fail. Network devices 1220(1)-1220(3) each operate multiple uplinks to virtual network device 1302 as a single logical uplink. Additionally, in some embodiments, each network device 1220(1)-1220(3) operates as if that network device is coupled to a single distribution-layer device, virtual network device 1302, instead of operating as if that network device were coupled to two independent distribution-layer network devices.

Distribution-layer virtual network device sub-unit 1222(1) is also coupled to a server 1204(3) by a single link. Unlike access-layer network devices 1220(1)-1220(3), server 1204 (3) does not view distribution-layer network devices units 1222(1) and 1222(2) as a single logical network device. In this example, server 1204(3) will be unable to communicate via the distribution layer if either network device 1222(1) or the link coupling server 1204(3) to network device 1222(1) fails. It is noted that in alternative embodiments, a server such as server 1204(3) but having multiple ports could be coupled to each virtual network device sub-unit by a virtual link bundle, and that such a server could interact with virtual network device sub-units 1222(1) and 1222(2) as if those sub-units were a single virtual network device 1302.

Virtual network device sub-unit 1222(1) includes several cards, including control card 1402(1) and line cards 1404(1) and 1404(3). Similarly, virtual network device sub-unit 1222 (2) includes control card 1402(2) and line cards 1404(2) and 1404(4). Control card 1402(1) includes control unit 1410(1), forwarding engine 1412(1), and interfaces 1420(1) and 1420 (3). Control card 1402(2) likewise includes control unit 1410 (2), forwarding engine 1412(2), and interfaces 1420(2) and 1420(4).

In virtual network device sub-unit 1222(1), line card 1404 (1) includes forwarding engine 1414(1) and interfaces 1420 (5), 1420(7), and 1420(9). Interface 1420(7) is coupled to network device 1220(3). Interface 1420(9) is also coupled to network device 1220(1). Interface 1420(5) is unused in this example. Line card 1404(3) includes forwarding engine 1414 (3), interfaces 1420(11) and 1420(13), and port 1420(15). Interfaces 1420(11) and 1420(13) are respectively coupled to network devices 1220(2) and 1220(1). Interface 1420(15) is coupled to server 1204(3). In embodiments in which network devices 1220(1)-1220(3) are adjunct network devices controlled by virtual network device 1302, interfaces 1420(7), 1420(9), 1420(11), and 1420(13) are operated as uplink interfaces, while interface 1420(15), which is not coupled to an adjunct network device, is operated as a normal port.

In virtual network device sub-unit 1222(2), line card 1404 (2) includes forwarding engine 1414(2) and interfaces 1420 (6), 1420(8), and 1420(10). Interface 1420(8) is coupled to adjunct network device 1220(2), and interfaces 1420(6) and 1420(10) are unconnected. Line card 1404(4) includes forwarding engine 1414(4) and interfaces 1420(12), 1420(14), and 1420(16). Interfaces 1420(12) and 1420(16) are respectively coupled to adjunct network devices 1220(3) and 1220 (1). Interface 1420(14) is unused. In embodiments in which network devices 1220(1)-1220(3) are adjunct network devices controlled by virtual network device 1302, interfaces 1420(8), 1420(12), and 1420(16) are operated as uplink interfaces, Note that while the interfaces in FIG. 14 have been described as both ingress and egress interfaces, interfaces that act as ingress-only or egress-only interfaces can also be used. For example, the functionality of each of the interfaces shown in FIG. 14 can be implemented using one ingress-only interface and one egress-only interface. Similarly, virtual link bundles 1350(1)-1350(3) can each include several links that only convey packets from a respective network device 1220 (1)-1220(3) to virtual network device 1302 and several links that only convey packets from virtual network device 1302 to a respective network device 1220(1)-1220(3).

In the illustrated embodiment, control card 1402(1) in virtual network device sub-unit 1222(1) is coupled to control card 1402(2) in virtual network device sub-unit 1222(2) via a virtual network device link 1460. In this example, virtual network device link 1460 includes two links (two links are used to provide increased fault-tolerance and/or bandwidth; however, one link can be used in other embodiments). These links are a type of uplink in this example, carrying information (e.g., such as headers similar to those sent between line cards) in addition to packets. The uplinks in virtual network device link 1460 are used to exchange information, which controls the operation of virtual network device 1302, as well as packets between virtual network device sub-units 1222(1) and 1222(2). By communicating via these uplinks, virtual network device sub-units 1222(1) and 1222(2) coordinate their behavior such that virtual network device sub-units 1222 (1) and 1222(2) appear to be a single virtual network device to network devices 1220(1)-1220(3).

Thus, providing interconnections between virtual network device sub-units 1222(1) and 1222(2) allows virtual network device sub-units 1222(1) and 1222(2) to operate as a single virtual network device 1302. Network devices 1220(1)-1220 (3) communicate with virtual network device 1302 in the same way that network devices 1220(1)-1220(3) would communicate with a single physical device. For example, if network device 1220(2) is handling a packet addressed to server 1204(3), network device 1220(2) selects one of the two uplinks in network device bundle 1350(2) on which to send the packet. This selection is based on load-sharing criteria in some embodiments. In such a situation, since virtual network device 1302 appears to be a single network device, network device 1220(2) is just as likely to select the uplink to virtual network device sub-unit 1222(2) as the uplink to virtual network device sub-unit 1222(1), despite the fact that only virtual network device sub-unit 1222(1) has a direct connection to server 1204(3). If the packet is sent to virtual network device sub-unit 1222(2), network device 1222(2) uses one of the uplinks included in virtual network device link 1460 between virtual network device sub-units 1222(1) and 1222 (2) to send the packet to virtual network device sub-unit 1222(1), and virtual network device sub-unit 1222(1) can in turn provide the packet to the packet's destination, server 1204(3).

In other embodiments, network devices 1220(1)-1220(3) are aware that virtual link bundles 1350(1) and 1350(2) actually terminate on two different network devices. Network devices 1220(1)-1220(3) control packet transmission based on this information. For example, in this situation, network device 1220(2) handles a packet addressed to server 1204(3) by selecting the uplink coupled to virtual network device sub-unit 1222(1) instead of the uplink coupled to virtual network device sub-unit 1222(2), based on the fact that network device 1220(2) recognizes separate connections to two different network devices within the logical link.

Interfaces 1420(13), 1420(9), and 1420(16), which are each coupled to network device 1220(1) by virtual link bundle 1350(1), form an interface bundle (e.g., an EtherChannel™ port bundle). Similarly, interfaces 1420(11) and 1420(8) form another interface bundle that is coupled to network device 1220(2) by virtual link bundle 1350(2). Interfaces 1420(7) and 1420(12) form a third interface bundle that is coupled to network device 1220(3) by virtual link bundle 1350(3). Within virtual network device 1302, each interface in the same interface bundle is assigned the same logical identifier. For example, interfaces 1420(13), 1420(9), and 1420(16) are each assigned the same logical identifier. In some embodiments, packets received via one of these interfaces are tagged or otherwise associated with the logical identifier to indicate that those packets were received via the virtual link bundle coupling virtual network device 1302 to network device 1220(1). It is noted that similar interface bundles are implemented within each network device 1220(1)-1220(3), and that interfaces included in such bundles are also assigned the same logical identifier by each network device (or by virtual network device 1302, in embodiments in which virtual network device 1302 controls the configuration of the network devices 1220(1)-1220(3)). For example, network device 1220(1) can assign the same logical identifier to each of the interfaces coupled to virtual link bundle 1350(1).

The association between a packet and a particular logical identifier is used by forwarding engines within virtual network device 1302 to route and forward packets to and from network devices 1220(1)-1220(3). For example, when a packet from a sending device (e.g., a client coupled to network device 1220(1)) is received via uplink interface 1420(13), virtual network device sub-unit 1222(1) learns that the sending device's MAC address is "behind" uplink interface 1420(13) by associating the MAC address with the logical identifier of uplink interface 1420(13). Virtual network device sub-unit 1222(1) informs each forwarding engine in virtual network device sub-unit 1222(1) as well as each forwarding engine in virtual network device sub-unit 1222(2) of this association. Based on the association, packets addressed to that MAC address will be sent from an uplink interface having the associated logical identifier. Since in this case, uplink interfaces 1420(9) (in virtual network device sub-unit 1222(1)) and 1420(16) (in virtual network device sub-unit 1222(2)) also have the same logical identifier as uplink interface 1420(13), a packet addressed to that MAC address can be forwarded via any of uplink interfaces 1420(9), 1420(13), and 1420(16).

The same logical identifiers are used to identify uplink interface bundles by each of virtual network device sub-units 1222(1) and 1222(2), and the virtual network device sub-units coordinate to assign the same logical identifier to each uplink interface within the same uplink interface bundle. When forwarding packets via an uplink interface bundle identified by a particular logical identifier, each virtual network device sub-unit 1222(1) and 1222(2) generates a hash value to select one of the uplink interfaces within that uplink interface bundle on which to send the packet. Each of the virtual network device sub-units uses these hash values to identify local uplink interfaces within that virtual network. Thus, each virtual network device sub-unit will only select an uplink interface that is local to that virtual network device sub-unit. For example, if virtual network device sub-unit 1222(1) is forwarding a packet via the uplink interface bundle that includes interfaces 1420(9), 1420(13), and 1420(16), the hash value generated by virtual network device sub-unit will identify one of interfaces 1420(9) or 1420(13).

In the above example, by associating each hash value with local uplink interfaces in the uplink interface bundle, the usage of virtual switch link 1460 is reduced. Essentially, virtual network device sub-unit 1222(1) favors local uplink interfaces within a particular uplink interface bundle over remote uplink interfaces, in the same uplink interface bundle, on virtual network device sub-unit 1222(2). Likewise, virtual network device sub-unit 1222(2) favors local uplink interfaces within a particular uplink interface bundle over uplink interfaces included in virtual network device sub-unit 1222(1). For example, if virtual network device sub-unit 1222(2) needs to forward a packet via an uplink interface, virtual network device sub-unit 1222(2) will send that packet via uplink interface 1420(12) instead of forwarding that packet across virtual network device link 1460 to be sent via uplink interface 1420(7). By favoring local interfaces, the amount of traffic sent over virtual network device link 1460 is reduced, since each virtual network device sub-unit 1222(1) and 1222(2) will forward locally-received packets (i.e., packets received via interfaces other than those coupled to virtual network device link 1460) from a local interface.

In some embodiments, for a given virtual link bundle, that virtual link bundle is managed (e.g., with respect to control protocols such as L2 protocols) in a central location. For example, all of the control protocol processing for virtual link bundle 1350(1) can take place in control unit 1410(1) of virtual network device sub-unit 1222(1). The results of this control protocol processing are then communicated to control unit 1410(2) of virtual network device sub-unit 1222(2) and/or to a controller in network device 1220(1). Control unit 1410(2) then uses (but not modify) this information when controlling how packets sent from and received via uplink interface 1420(16) (which is in the uplink interface bundle coupled to virtual link bundle 1350(1)) are handled. For example, control unit 1410(2) uses this information to set up or modify lookup tables on line cards 1404(2) and/or 1404(4). In this way, the actual control protocol processing is centralized in control unit 1410(1), as opposed to being distributed among several control units in virtual network device 1302.

The central point of control protocol processing can vary among virtual link bundles. For example, while control protocol processing for virtual link bundle 1350(1) is managed by control unit 1410(1), control protocol processing for virtual link bundle 1350(2) can be managed by control unit 1410(2). In other words, control unit 1410(2) can perform all of the control processing for virtual link bundle 1350(2), and the information generated by control unit 1410(2) can then be communicated to control unit 1410(1) for use (but not modification) within virtual network device sub-unit 1222(1).

In embodiments that implement a central point of management within virtual network device 1302 for each virtual link bundle's control protocol processing, L2 protocols can be run across the virtual link bundle and/or interface bundles can be used as routed L3 interfaces. These abilities would not be available if the virtual network device sub-units within virtual network device 1302 each performed control protocol processing for local interfaces independently of each other. Additionally, in embodiments implementing a central point of control protocol processing, a user can modify the virtual link bundle's control protocol behavior by accessing a single virtual network device sub-unit. In the above example, when updating control protocol behavior of virtual link bundle 1350(1), a user can simply access virtual network device sub-unit 1222(1) (instead of accessing both virtual network device sub-units 1222(1) and 1222(2)). Virtual network device sub-unit 1222(1) then automatically propagates to network device 1222(2) any changes made by the user to the control protocols. Furthermore, since the use of virtual link bundles allows several uplinks to be managed as a single logical uplink, fewer uplink interfaces need to be configured than would be required if virtual link bundles were not used. For example, if each virtual link bundle includes two uplinks, the number of uplink interfaces within virtual network device 1302 that need to be configured by a user is halved.

Virtual network device sub-units 1222(1) and 1222(2) implement certain behaviors in order to act as a virtual network device 1302 that, from the perspective of network devices 1220(1)-1220(3), appears to be a single logical network device. For example, whenever virtual network device sub-unit 1222(2) receives a packet from a local network device, client, or server and that packet's destination logical identifier identifies an uplink interface bundle, virtual network device sub-unit 1222(2) sends the packet from a local uplink interface within the identified uplink interface bundle. Virtual network device sub-unit 1222(2) can also provide the packet to virtual network device sub-unit 1222(1), but virtual network device sub-unit 1222(1) should not output this packet on a virtual link bundle. This way, the destination device only receives one copy of the packet from virtual network device 1302 (as opposed to receiving one copy from each virtual network device sub-unit 1222(1) and 1222(2)) and the appearance of virtual network device 1302 being a single entity is maintained.

To operate in this way, each egress uplink interface coupled to a link in a virtual link bundle is configured to filter out traffic received via virtual network device link 1460. For example, a packet is received at virtual network device sub-unit 1222(1) via virtual network device link 1460. The interface 1420(1) or 1420(3) that receives the packet updates information (e.g., in a header) associated with the packet to indicate that the packet was received via virtual network device link 1460 (in alternative embodiments, the sending interface in virtual network device sub-unit 1222(2) can update this information). When virtual network device sub-unit 1222(1) looks up the destination address of the packet in a lookup table, the lookup table returns the logical identifier that identifies local uplink interfaces 1420(9) and 1420(13). The packet is then forwarded to uplink interface 1420(13) (e.g., selected based on load-sharing considerations). When uplink interface 1420(13) receives the packet, uplink interface 1420(13) will only output the packet if the packet was not received via virtual switch link 1460, since if the packet was received via the virtual switch link, the other virtual network device sub-unit 1222(2) will have already sent the packet via the virtual link bundle. Thus, uplink interface 1420(13) can filter the packet from the packet flow being sent via uplink interface 1420(13) based on the information appended to the packet that indicates whether the packet was received via virtual network device link 1460.

In some embodiments, MAC notification frames are used to keep the content of the L2 tables in virtual network device sub-unit 1222(1) synchronized with the content of the L2 tables in virtual network device sub-unit 1222(2) and vice versa. Whenever a MAC notification that involves a port behind a virtual link bundle or an uplink interface included in an uplink interface bundle is generated within a virtual network device sub-unit (e.g., such a notification can be generated by one line card in order to update an L2 table on another line card), a copy of the MAC notification is sent via to virtual network device link 1460. Similarly, if a virtual network device sub-unit determines that a packet should be flooded, the virtual network device sub-unit will send a copy of that packet via virtual network device link 1460, ensuring that the virtual network device sub-unit will receive a copy of any MAC notification response generated by a forwarding engine in the peer virtual network device sub-unit.

By way of example, assume that virtual network device sub-unit 1222(1) floods a packet because the forwarding engine(s) included in virtual network device sub-unit 1222(1) do not know which port or uplink interface is associated with the packet's destination address. As part of flooding the packet, virtual network device sub-unit 1222(1) sends a copy of the packet to virtual network device sub-unit 1222(2) via virtual switch link 1460. If a forwarding engine within virtual network device sub-unit 1222(2) already knows that the destination address is behind a particular uplink interface or port (e.g., if a forwarding table already includes an entry associating the destination address with a port of one of network devices 1220), that forwarding engine generates a MAC notification identifying this association, which is distributed to any other forwarding engines within virtual network device sub-unit 1222(2). Since the packet was originally received via virtual network device link 1460, virtual network device sub-unit 1222(2) also sends a copy of the MAC notification back via virtual network device link 1460. This MAC notification is then distributed among the forwarding engines included in virtual network device sub-unit 1222(1). After being updated based on the MAC notification, the forwarding engines in virtual network device sub-unit 1222(1) now know the location of the device identified by the destination address. Accordingly, subsequently-received packets addressed to that device are not flooded.

When all of the physical links in a virtual link bundle that connect to a single virtual network device sub-unit fail, the virtual link bundle transitions to a normal link bundle that is coupled to a single virtual network device sub-unit. At this point, the behavior of each virtual network device sub-unit with respect to that network device bundle is modified. For example, assume that all of the uplinks in virtual link bundle 1350(1) that are coupled to virtual network device sub-unit 1222(2) fail. At this point, virtual network device sub-unit 1222(2) no longer has any local uplink interfaces that can send packets via virtual link bundle 1350(1). Accordingly, virtual network device sub-unit 1222(2) will redirect all traffic that needs to be sent via virtual link bundle 1350(1) across virtual network device link 1460. Additionally, since network device 1222(2) can no longer send packets via virtual link bundle 1350(1), virtual network device sub-unit 1222(1) will cease to filter traffic received via virtual network device link 1460 from being sent via virtual link bundle 1350(1). If at least one of the uplinks in virtual link bundle 1350(1) that is coupled to virtual network device sub-unit 1222(2) is restored, virtual link bundle 1350(1) will transition back to the normal mode of operation, in which virtual network device sub-unit 1222(2) will send locally-received packets via virtual link bundle 1350(1) and virtual network device sub-unit 1222(1) will filter packets received via virtual network device link 1460 from being sent virtual link bundle 1350(1).

Although the present invention has been described with respect to specific embodiments thereof, various changes and modifications may be suggested to one skilled in the art. It is intended such changes and modifications fall within the scope of the appended claims.

What is claimed is:

1. A method comprising:
   detecting an identifier change from an old identifier to a new identifier;
   updating a value of a flag, in response to the detecting, wherein
   the updated value of the flag indicates that the old identifier should be included in one or more PAgP PDUs;
   sending a Port Aggregation Protocol (PAgP) protocol data unit (PDU), wherein
   the PAgP PDU comprises the new identifier and the old identifier,
   the new identifier identifies a network device subsequent to the identifier change,
   the new identifier is a Media Access Control (MAC) address,
   the PAgP PDU comprises an "old device identifier" field,
   the "old device identifier" field of the PAgP PDU comprises the old identifier, and
   the old identifier identifies the network device prior to the identifier change; and sending a second PAgP PDU, wherein
   the second PAgP PDU does not include the "old device identifier" field, and
   the sending the second PAgP PDU occurs prior to the detecting;
   receiving a third PAgP PDU subsequent to the updating the value of the flag, and
   preventing an interface from being removed from an aggregated interface, in response to
   receiving the third PAgP PDU, wherein
   the third PAgP PDU comprises the old identifier, and
   the third PAgP PDU is received by the interface.

2. The method of claim 1, further comprising:
   sending a fourth PAgP PDU subsequent to the detecting the identifier change, wherein
   the fourth PAgP PDU comprises the new identifier, and
   the fourth PAgP PDU does not comprise the "old device identifier" field, unless the second PAgP PDU is sent via an aggregated interface.

3. The method of claim 1, further comprising:
   detecting whether a partner interface is executing a compatible version of PAgP, wherein
   the PAgP PDU is sent via an interface, and
   the partner interface is coupled to the interface by a link.

4. The method of claim 3, further comprising:
   providing the compatible version of PAgP to the partner interface via the link, if the partner interface is not executing the compatible version.

5. The method of claim 3, further comprising:
   inhibiting the partner interface from including the link in an aggregated link if the partner interface is not executing the compatible version of PAgP.

6. A method comprising:
   using a first identifier to identify both a first interface of a first component and a second interface of a second component in a PAgP PDU sent via the first interface and in a PAgP PDU sent via the second interface; and
   causing the first interface to use a second identifier in a second PAgP PDU sent via the first interface, if the first component is moved to a different location in a network, wherein the causing the first interface to use the second identifier comprises:
   prompting a network administrator to enter a new media access control (MAC) address for use by the first interface, in response to the first component being moved to the different location in the network; and
   the first interface using the new MAC address as the second identifier in the second PAgP PDU sent via the first interface; and
   sending the second PAgP PDU via the first interface, wherein
   the second PAgP PDU comprises the second identifier and information,
   the information indicates that an identifier change is occurring.

7. The method of claim 6, wherein
   the information comprises the first identifier.

8. A system comprising:
   a first network device; and
   a second network device coupled to the first network device, wherein
   the first network device comprises a first interface configured to detect an identifier change and to send a link aggregation protocol PDU to the second network device, wherein
   the first interface is identified by an old identifier prior to the identifier change,
   the first interface is identified by a new identifier subsequent to the identifier change,
   the new identifier is a Media Access Control (MAC) address,
   the link aggregation protocol PDU comprises an "old device identifier" field dedicated to conveying the old identifier,
   the interface is configured to send a second link aggregation protocol PDU to the second network device, wherein
   the second link aggregation protocol PDU does not comprise the "old device identifier" field,
   the second link aggregation protocol PDU is sent prior to the detecting the identifier change,
   the "old device identifier" field is encoded as a Type, Length, and Value (TLV),
   a type portion of the TLV identifies that the TLV is an old device identifier field, the link aggregation protocol is PAgP,
   the second network device comprises a second interface configured to receive one or more link aggregation protocol PDUs from the first network device, and
   the second network device is configured to remove the second interface from an aggregated interface in response to one of the one or more link aggregation protocol PDUs comprising a new identifier, unless the one of the one or more link aggregation protocol PDUs also comprises the "old device identifier" field.

9. A network device comprising:
   an interface comprising a port aggregation protocol (PAgP) protocol data unit (PDU) handling module, wherein
   the PAgP PDU handling module is configured to send a PAgP PDU comprising a new identifier and information that indicates an identifier change,
   the new identifier is a Media Access Control (MAC) address, the interface is configured to detect whether a partner interface is executing a compatible version of PAgP, the partner interface is coupled to the interface by a link, the new identifier identifies the interface subsequent to the identifier change, the PAgP PDU comprises an "old device identifier" field, the "old device identifier" field of the PAgP PDU comprises the information, the information comprises an old identifier, the old identifier identifies the interface prior to the identifier change the PAgP PDU handling module is configured to send a second PAgP PDU subsequent to the identifier change, the second PAgP PDU comprises the new identifier, and the second PAgP PDU does not comprise the "old device identifier" field, unless the second PAgP PDU is sent via an aggregated interface.

10. The network device of claim 9, wherein the PAgP PDU handling module is configured to send a second PAgP PDU, wherein the second PAgP PDU does not include the "old device identifier" field, and the second PAgP PDU is sent prior to the identifier change.

11. The network device of claim 9, wherein the PAgP PDU handling module is configured to update a value of a flag, in response to the identifier change, wherein the updated value of the flag indicates that the information should be included in one or more PAgP PDUs.

12. The network device of claim 11, wherein the PAgP handling module is configured to:

receive a second PAgP PDU subsequent to the updating the value of the flag, and prevent the interface from being removed from an aggregated interface, in response to receipt of the second PAgP PDU, wherein the second PAgP PDU comprises the old identifier, and the second PAgP PDU is received via the interface.

13. The network device of claim 9, wherein the interface is configured to provide the compatible version of PAgP to the partner interface via the link, if the partner interface is not executing the compatible version.

14. The network device of claim 9, wherein the interface is configured to inhibit the partner interface from including the link in an aggregated link if the partner interface is not executing the compatible version of PAgP.

15. A network device comprising:

a first component comprising a first interface, wherein the first interface is configured to:

use a first identifier to identify the first interface in a PAgP PDU sent via the first interface; and a second component coupled to the first component, wherein the second component comprises a second interface configured to use the first identifier to identify the second interface in a second PAgP PDU sent via the second interface, the first component is configured to cause the first interface to use a second identifier in a third PAgP PDU sent via the first interface, if the first component is moved to a different location in a network, and the first component is configured to prompt a network administrator to enter a media access control (MAC) address for use by the first interface, in response to the first component being moved to the different location in the network, and the first interface is configured to use the new MAC address as the second identifier in the third PAgP PDU sent via the first interface.

* * * * *